US008666994B2

(12) United States Patent
Ogilvy et al.

(10) Patent No.: US 8,666,994 B2
(45) Date of Patent: Mar. 4, 2014

(54) DOCUMENT ANALYSIS AND ASSOCIATION SYSTEM AND METHOD

(75) Inventors: Hamish Ogilvy, Mullion Ck NSW (AU); Owen James Prime, Chatswood (AU); Phillip Anthony Burns, Cammeray (AU)

(73) Assignee: Sajari Pty Ltd (AU)

( * ) Notice: Subject to any disclaimer, the term of this patent is extended or adjusted under 35 U.S.C. 154(b) by 0 days.

(21) Appl. No.: 13/498,244

(22) PCT Filed: Sep. 24, 2010

(86) PCT No.: PCT/AU2010/001259
§ 371 (c)(1), (2), (4) Date: Apr. 24, 2012

(87) PCT Pub. No.: WO2011/035389
PCT Pub. Date: Mar. 31, 2011

(65) Prior Publication Data
US 2012/0278341 A1 Nov. 1, 2012

Related U.S. Application Data

(60) Provisional application No. 61/246,121, filed on Sep. 26, 2009.

(51) Int. Cl.
*G06F 7/00* (2006.01)
*G06F 17/30* (2006.01)

(52) U.S. Cl.
USPC .......................................... 707/749; 707/705

(58) Field of Classification Search
None
See application file for complete search history.

(56) References Cited

U.S. PATENT DOCUMENTS

| 4,839,853 | A | | 6/1989 | Deerwester et al. |
| 5,826,261 | A | * | 10/1998 | Spencer ................................. 1/1 |
| 6,012,053 | A | * | 1/2000 | Pant et al. ............................. 1/1 |
| 6,490,575 | B1 | * | 12/2002 | Berstis .................................. 1/1 |
| 6,847,966 | B1 | | 1/2005 | Sommer et al. |
| 6,880,002 | B2 | | 4/2005 | Hirschfeld et al. |
| 6,978,274 | B1 | | 12/2005 | Gallivan et al. |

(Continued)

FOREIGN PATENT DOCUMENTS

WO 2008100522 8/2008

OTHER PUBLICATIONS

International Search Report for PCT/AU2010/001259, Completed by the Australian Patent Office on Jan. 28, 2011, 5 pages.

(Continued)

*Primary Examiner* — Ajay Bhatia
*Assistant Examiner* — Jessica N Le
(74) *Attorney, Agent, or Firm* — Brooks Kushman P.C.

(57) ABSTRACT

Methods and systems for indexing a plurality of documents, each document comprising a text portion, the method parses the text portion of each of the plurality of documents to form a plurality of respective local document indexes each associated with a respective document, and stores the local document index in a database, Each local document index has a plurality of local text terms and a local weighting associated with each text term From the plurality of local document indexes, forming a global document index associated with each global text term. The global weighting is determined with respect to a parameter associated with a reference global text term. Also, methods and systems for analyzing a text portion, retrieving documents from a database relevant to the text portion and for refining the results of a search are disclosed.

25 Claims, 7 Drawing Sheets

(56) References Cited

U.S. PATENT DOCUMENTS

| | | |
|---|---|---|
| 8,392,400 B1 * | 3/2013 | Ransil et al. .................. 707/716 |
| 2002/0103799 A1 | 8/2002 | Bradford et al. |
| 2003/0135430 A1 * | 7/2003 | Ibbotson ........................ 705/27 |
| 2004/0205461 A1 | 10/2004 | Kaufman et al. |
| 2005/0050023 A1 * | 3/2005 | Gosse et al. ...................... 707/3 |
| 2005/0149500 A1 * | 7/2005 | Marmaros et al. ................ 707/3 |
| 2006/0031195 A1 | 2/2006 | Patterson |
| 2006/0047441 A1 | 3/2006 | Homayouni et al. |
| 2007/0005589 A1 | 1/2007 | Gollapudi |
| 2007/0150492 A1 * | 6/2007 | Shitomi ........................ 707/100 |
| 2008/0027918 A1 * | 1/2008 | Altevogt et al. .................. 707/3 |
| 2008/0319973 A1 | 12/2008 | Thambiratnam et al. |
| 2010/0169339 A1 * | 7/2010 | Junqueira et al. ............. 707/758 |
| 2010/0174718 A1 * | 7/2010 | Chen et al. .................... 707/741 |

OTHER PUBLICATIONS

Dumais. Behavior Research Methods, Instuments and Computers 1991, vol. 23, No. 2, p. 229-236, "Improving the retrieval of information from external sources."

* cited by examiner

DOCUMENT ANALYSIS AND ASSOCIATION SYSTEM AND METHOD

CROSS-REFERENCE TO RELATED APPLICATION

This application is the U.S. national phase of PCT Appln. No. PCT/AU2010/001259 filed on Sep. 24, 2010, which claims the benefit of U.S. provisional application 61/246,121, filed on Sep. 26, 2009, the disclosures of which are incorporated in their entirety by reference herein.

TECHNICAL FIELD

The present invention relates generally to schemes for information extraction from text strings and/or documents containing text portion(s) and in particular to methods and apparatus for analysing text strings and/or documents and associating such documents with relevant information or documents from a database.

The present invention further relates to identifying and retrieving documents related to text. More specifically, the present invention relates to identifying and retrieving text portions (or text fragments) of interest from a larger corpus of textual material by generating a list of relevant terms from the textual material and weighting such terms to be used to analyse a database of documents for information and/or documents related to the weighted terms.

The invention has been developed primarily for use as method and system for analysing a text portion and relating such text portion to related information and/or documents in a database. However, it will be appreciated that the invention is not limited to this particular field of use.

BACKGROUND

Any discussion of the background art throughout the specification should in no way be considered as an admission that such background art is prior art, nor that such background art is widely known or forms part of the common general knowledge in the field.

Traditional text search methods use a very small amount of input text i.e. a few words (keywords) and, based on that small amount of text, these traditional methods search huge databases and attempt to display useful documents which are relevant to the keywords as an output. This type of search method is very useful when there is little subject matter available to the searcher and the aim is to find subject matter as fast as possible. This type of searching i.e. text or keyword to relevant document(s), is the most commonly performed search on the internet and perhaps in the world today. Searching on www.google.com, say for example using the keywords "Britney Spears" is a typical example of this type of search. The user (searcher) performing such searches initiates the search with very little information, so the relevance of the documents returned to the user with respect to the keywords is often an estimated output based on the statistically most desired outcome, since the keywords themselves produce a huge number of document matches and yet there is not enough information in the input text to inherently order all these matches in terms of relevance to the particular desires of the user/searcher.

As the number of documents in the database to be searched becomes large and the amount of input text becomes small, the relevance of the documents in the search results becomes impossible to determine without additional information (i.e. information that is not contained in the initial input text or search query). In the case of internet search engines such as Google™, YAHOO™, Microsoft BING™ and others, the developers of the search algorithms have found ways to improve the relevance of the search results, most notably through the page rank algorithm of Google™, which essentially uses hypertext link structures to form a popularity index of billions of documents and millions of search terms.

Popularity works well for internet 'text to document' searching, since the popularity methodology finds appropriate information relevant to the input search query in the vast majority of cases. However, this type of searching is less useful for document-to-document searching as the input and output requirements are vastly different. Document-to-document searching is initiated with far more input text and in general a greater expectation of relevant output results given the increased input information. To date, Google™ limits the number of input terms in the search query to 50 terms or 2048 characters. The nature of the Google™ search tends (not always, but generally this is the case) to find fewer results as more information is added to the search query, as additional input text terms are used to exclude (prune) as many documents as possible from the search results. This is not a useful approach with document-to-document searching since the only document likely to match a particular document when using the text contained therein as the input search terms is itself.

Other traditional search methods use technology based on matching meta information. The meta information is essentially a group of labels (or tags) applied to each document, which allow documents to be aligned in different dimensions. An example concerning job searching is a candidate looking for a job with the two meta fields Location="Los Angeles" and Job Type="full time". All documents without these meta matches are excluded. The specific nature of meta tags allows databases to be searched very quickly as the database is searching for a match (or non match) in a field instead of a match across a full document, which allows many documents to be excluded from the search before examining the full text contents. However, meta searching has several disadvantages, most notably these tags must be created for every document in the database. This is usually done manually as part of the database input process, which is extremely time consuming and also prevents batch importing of data. Although techniques such as Latent Semantic Indexing (LSI) are becoming more popular due to their ability to semantically determine appropriate tags. The second most notable issue is cross-compatibility issues surrounding different databases. Often each database provider uses different conventions for each meta field, making searching across different platforms virtually impossible. In some cases meta tags are produced automatically, but in many cases this is either simply not practical, highly limiting, or results in large instances of errors in the information assigned to meta tags for documents in the database.

Unlike text-to-document searches and meta searching as mentioned above, document-to-document searches have further additional complexity on the input processing requirements and therefore need different methodologies for calculating the relevance of documents in the database with respect to the input document. In particular, the aim of document-to-document searches is not to find new information (as with text-to-document or meta tag searches), but rather to find the most similar documents, or documents containing the most relevant information. The applications for this type of document searching are huge, such as research, job-candidate matching, legal case matching, patent portfolio management, and many others. In all these cases the searcher begins with at least one document, which is a comparatively large amount of information in comparison to text-to-document and meta tag searching as outlined above.

There are several examples of document-to-document searching applications. For example Iparadigms LLC, USA have developed a document searching engine for the detection of plagiarism in student and academic works. This technology looks for identical word strings in reference documents stored in a database which match an input text portion, or portions of the input text, which may be for example an essay or paper submitted by a student as part of a course of study. This type of search is very useful for finding very similar pieces of content (i.e. similar wording), but breaks down when trying to find documents with similar content using different wording.

Furthermore, Burning Glass Technologies, USA have developed technology specifically for the human resources industry. The Burning Glass technology identifies successful candidates for a given position and then looks for candidates with similarities to previous candidates who have been successful in jobs with similar selection criteria. This type of matching uses hidden markov models, and is often very useful technology, but such models have the disadvantage that they must rely on the identification of previous successes to predict new successes. This inherently requires repetition of the same job description, so is largely only useful for large companies refilling similar positions. This technology is also not very useful outside of job searching, as most other document-to-document searches are not repeated, evaluated and repeated again. As such, Burning Glass aims at company/institution based integrations instead of a more global approach to matching, as the search technology relies on repetition and established definitions of success, which in general work better inside a closed system.

In other examples of search methodologies, patent matching technologies, such as Patent Café Inc, USA employ Latent Semantic Analysis (LSA) techniques to help with patent searching, portfolio analysis, patent strength, etc. This methodology looks at text terms and uses inverse weighting based on population scores (how rare each term is) to give scores to terms to find a match, for example as described in U.S. Pat. No. 4,839,853. However, LSA techniques are limited by how well the system is initially set up, and relies primarily on inverse word population analysis which can be unreliable in many applications. Also, LSA techniques are generally not able to be adapted in real-time as a result of user interactions with results obtained by such LSA-type techniques i.e. these techniques are largely rigid and slow or unable to adapt as the information in the database(s) changes or to external input e.g. from a user and/or additional/external information source(s). LSA analysis also becomes extremely computationally intensive as the number of terms in the input becomes large, as LSA usually uses a two dimensional matrix, with terms and documents on each corresponding axis. This produces a semantic vector identifying each document in what is called the "term space". As the number of terms and/or the number of documents becomes large, approximations are required to reduce the computational load. This reduction is typically done by grouping semantically similar terms (they exhibit many common documents) into higher-level groupings to reduce the term space. Unfortunately, however, this simplification has several drawbacks, mainly with regards to a) very rare terms that don't fit into any groupings, b) words with double meanings (polysemy), which fool the groupings and c) multiple words with similar meanings (synonyms). The reliance on approximations can produce much poorer results when either of these contextual issues are present on key search terms.

Another search methodology involves a process of receiving a query, identifying phrases within the query, identifying possible extension(s) of the phrases in the query, and searching a database of documents for coincidences between phrases in the documents and the phrase extensions identified from the query. Such a method is disclosed in US patent application No. 20060031195. This method appears to have many similarities with, autocomplete functions, for example as used by Google™ to predict extensions to a query of a few terms based on the popularity of previous search queries to narrow the search beyond that which could be achieved from the initial query. However, such methods are more suited to input queries of only a few terms and will have difficulties when the number of input query terms becomes large (greater than 10 or more), which would likely place extremely large computational loads on identification of phrases and phrase extensions.

Therefore a need exists for a new approach to text searching, particularly involving whole document to document searching applications where the input document comprises a large number of input terms.

DEFINITIONS

The following definitions are provided as general definitions and should in no way limit the scope of the present invention to those terms alone, but are put forth for a better understanding of the following description.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data," refers to the display of the data without intentional delay, given the processing limitations of the system and the time required to accurately measure the data.

The term "text portion" refers to a section of text comprising at least one word.

The term "text term" refers to an ordered sequence of one or more words for example a grouping of words with at least one term. A "reference text term" refers to a text term that exists, or is located, in a text portion of a reference document, where a reference document is one of many documents stored in a database upon which searches are made. Each reference document is a potential result of a search. Similarly, an "input text term" refers to a text term located in a text portion of an input document or it can be thought of as a string in programming terms. The term "global text term" refers to a text term that exists in the global index and hence has associated global weightings.

The term "input document" refers to a document which contains the input text portion that a user wishing to base a search on to find documents in the database (reference documents) that are of relevance to the input document. In the case of document-to-document searching this is analogous to the input text for an internet search using a search engine such as either Google™ or Yahoo™.

The term "input text portion" is related to the input document, except in this case the input may be multiple documents, or simply a grouping of text terms. Thus, it is in essence a generalization of the input text to be searched against.

The term "local document index" refers to a database representation of the text portion of a document, either a reference document stored in a database, or a document or text portion input to the system by a user for searching against the reference documents. In the present arrangements, the local document index generally comprises the text terms in the document determined from parsing of the document, and an text term weight associated with each term, although other information may also be stored in the local document index contains additional information to the text and is used for calculating the relevance of the results. Specifically, a local document index referring to an input document or text portion is referred to as an "input local index" or "input local text term index", and the term "local reference text term index" refers to the local document index formed for each of the reference documents in the database. Similarly, the terms "global text term index" or "global term index" or "global index" refers to an index (different to the local index) stored in the database containing summary information, such as weightings, on each text term across the entire corpus of documents stored in the database.

The term "local weighting" or "local text term weight" or similar terms refer to a numeric weighting value associated with a text term in the local text term index(s). Similarly, the term, "global weighting", "global text term weight" or similar terms refer to a numeric weighting value associated with a text term in the global text term index.

The term "augmented input local text term index" or "re-formed local text term index" refers to input local text term index after it has been adjusted (re-formed) to reflect user interaction with results retrieved by search queries of the database. Alternatively, the index may be re-formed based on information received from additional or external data source(s). Usually the augmented index is re-formed by an adjustment of the local text term weightings of text terms stored therein, however, other methods of re-forming the local index are discussed herein.

The terms "local text term weight" and "global text term weight" (and variations), refer to a numerical score given to each of the text terms in either a local text term index or global text term index respectively, and each weight may be determined from a number of parameters related to each term.

The term "representative text string" typically refers to a small portion of a document which is used to identify the document in search results presented to the user. The representative text string may be apportion of text surrounding one or more text terms in the document which are found to be relevant to the user's query and thus may be useful for the user to be able to determine the relevance of the document without reviewing the whole document.

The term "intersection" of terms generally refers to its standard meaning in the context of set analysis where an intersection is found for example when two or more documents share a particular text term. Such an intersection may also comprise an intersection between text terms which may be synonyms or otherwise related terms.

The present invention is described below with reference to block diagrams and/or flowchart illustrations of methods, apparatus (systems) and/or computer program products according to aspects and arrangements of the invention. It is to be understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fibre, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

SUMMARY

It is an object of the present invention to substantially overcome or at least ameliorate one or more of the disadvantages of the prior art, or at least to provide a useful alternative.

According to a first aspect, there is provided a method for indexing a plurality of documents. Each document may comprise a text portion. The method may comprise the step of parsing the text portion of each of the plurality of documents to form a plurality of respective local document indexes. Each local document index may be associated with a respective document. The local document index may be stored in a database, or alternatively in a file, or set of files. Each local document index may comprise a plurality of local text terms contained in the respective document. Each local document index may further comprise a local weighting associated with each text term. The method may further comprise the step of forming a global document index. The global document index may be formed from the plurality of local document indexes. The global document index may comprise a plurality of global text terms contained in the plurality of documents. The global document index may further comprise a global weighting associated with each global text term. The global weighting associated with each of the global text terms may be determined with respect to a parameter associated with a reference global text term. The global weighting associated with each of the global text terms may be determined with respect to a plurality of parameters, each parameter being associated with a respective reference global text term.

In an arrangement of the first aspect, there is provided a method for indexing a plurality of documents, each document comprising a text portion, the method comprising the steps of: a) parsing the text portion of each of the plurality of documents to form a plurality of respective local document indexes each associated with a respective document, and storing the local document index in a database, wherein each local document index comprises a plurality of local text terms contained in the respective document and a local weighting associated with each text term; and b) from the plurality of local document indexes, forming a global document index comprising a plurality of global text terms contained in the plurality of documents, and a global weighting associated with each global text term; wherein the global weighting associated with each of the global text terms is determined with respect to a parameter associated with a reference global text term.

The local document index may be stored as a single logical computer readable file comprising the text terms and associated weightings or alternatively as a related set of logical computer readable files, wherein each individual text term, or a group of text terms is stored as a distinct logical computer readable file comprising associated details and/or weightings associated to the respective text term.

The global weighting associated with each of the global text terms may be further determined with respect to the number of documents in which each global text term appears across all the plurality of documents. The global weighting associated with each of the global text terms may be determined with respect to the number of documents in which the reference text term appears.

The global weighting associated with each of the global text terms may be further determined with respect to user interactions. Additionally or alternatively, the global weighting associated with each of the global text terms may be further determined with respect to additional and/or external information sources. The local weighting associated with each text term may comprise a combination of a plurality of weightings, each associated with each local text term. One or the plurality of weightings may be determined with respect to one or more parameters selected from the group consisting of: the number of times the term appears in a single document; the number of times the term appears in all the plurality of documents; the position of the text term in a document; the capitalisation of the term; punctuation surrounding the term; words in the text portion adjacent to the term; word rarity; word sequence; combinations of text terms; or the number of words in each text term; a user-defined weighting; or other suitable parameters as would be appreciated by the skilled addressee. In addition or alternatively, the one or the plurality of weightings may be selected from the group of: font size of a word or text term, font family, font weight, font style, font decoration, font colour, subscript, superscript, and where the text term appears in document structure (e.g. in a heading, comment, footnote, headers, footers, or in the document's meta information). The global weighting associated with each global text term may be further determined with respect to the local weighting of each text term. The local weighting for a particular text term may be different when associated with different documents thus resulting in a plurality of local term weightings for the particular text term in which the text term appears, and the global weighting may be determined with respect to a combination of the plurality of local weightings for the particular text term The weighting may be a positive weighting or a negative weighting. Where one or more of the plurality of weightings is a negative weighting for a selected global text term, the selected global text term may be assigned a zero weighting. Alternatively, the weighting may be selected from a graduated scale of weightings from positive to negative, for example from a scale comprising for instance the graduated weightings: (very bad)-(bad)-(neutral)-(good)-(very good).

The user-defined weighting may be derived from a self-learning system comprising a plurality of user-defined weightings for a selected text term, either local text term(s) or global text term(s) or both.

A plurality of text terms may be identified in the text portion. Each of the plurality of text terms may be assigned at least one associated local term weight. The at least one or plurality of text terms may comprise single word terms within the input text portion. The relevant terms may comprise double-word terms within the input text portion. The at least one or plurality of text terms may comprise triple-word terms within the input text portion. The text portion may comprise a large number of text terms, for example up to or more than 5 text terms, or up to or more than 10, up to or more than 20, up to or more than 50, up to or more than 100, up to or more than 500, up to or more than 1000, up to or more than 5000, up to or more than 10000, up to or more than 20000, up to or more than 50000, up to or more than 100000, up to or more than 250000, up to or more than 500000, or up to or more than 1000000 or more text terms, and may depend on available processing capabilities.

The text portion may be a text string comprising a plurality of text words. The text portion may be a text document. The text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report. The text portion may comprise a large number of words, for example up to or more than 5 words, up to or more than 10, up to or more than 20, up to or more than 50, up to or more than 100, up to or more than 500, up to or more than 1000, up to or more than 5000, up to or more than 10000, up to or more than 20000, up to or more than 50000, up to or more than 100000, up to or more than 250000, up to or more than 500000, or up to or more than 1000000 or more words.

The reference documents may be text documents representative of a document selected from one or more of the group of: a book; an article; a text record; a certificate; an agreement; a contract; a manuscript; a paper; a scientific paper; a patent specification; an employment advertisement; a legal transcript; a legal document; or a news report.

According to a second aspect, there is provided a system for indexing a plurality of documents. Each document may comprise a text portion. The system may comprise a parsing module for parsing the text portion of each of the plurality of document to form a plurality of respective local document indexes each associated with a respective document. Each local document index may comprise a plurality of local text terms contained in the respective document and a local weighting associated with each text term. The system may further comprise a database adapted for storing each of the local document indexes in a memory, where the database maybe a conventional database, or alternatively it could be file based storage. The system may further comprise a processor for analysing the plurality of local document indexes and forming a global document index from the plurality of local document indexes. The global document index may comprise a plurality of global text terms contained in the plurality of documents. The global document index may further comprise a global weighting associated with each global text term. The global weighting associated with each of the global text terms may be determined with respect to a parameter associated with a reference global text term; The global document index may be stored in the database and related to each of the local document indexes.

In an arrangement of the second aspect, there is provided a system for indexing a plurality of documents, each document comprising a text portion, the system comprising: a parsing module for parsing the text portion of each of the plurality of document to form a plurality of respective local document indexes each associated with a respective document, wherein each local document index comprises a plurality of local text terms contained in the respective document and at least one local weighting associated with each text term; a database adapted for storing each of the local document indexes in a memory; a processor for analysing the plurality of local document indexes and forming a global document index from the plurality of local document indexes, the global document index comprising a plurality of global text terms contained in the plurality of documents, and a global weighting associated with each global text term; wherein the global weighting associated with each of the global text terms is determined with respect to a parameter associated with a reference global text term; and wherein the global document index is stored in the database and related to each of the local document indexes.

A plurality of text terms may be identified in the text portion. Each of the plurality of text terms may be assigned at least one associated local term weight. The associated local term weight(s) may be determined with reference to the global term index.

The at least one or plurality of text terms may comprise single word terms within the input text portion. The relevant terms may comprise double-word terms within the input text portion. The at least one or plurality of text terms may comprise triple-word terms within the input text portion.

The text portion may be a text string comprising a plurality of text words. The text portion may be a text document. The text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report.

The reference documents may be text documents, or documents comprising a text portion, representative of a document selected from one or more of the group of a book; an article; a text record; a certificate; an agreement; a contract; a manuscript; a paper; a scientific paper; a patent specification; an employment advertisement; a legal transcript; a legal document; or a news report. As so part of the searching process, each of the reference documents may be assigned a document relevance score representative of the relevance to the input text portion.

According to a third aspect, there is provided a method for analysing a text portion and retrieving documents relevant to the text portion. The method may comprise the step of receiving an input comprising an input text portion. The method may further comprise the step of identifying at least one text term in the text portion. The method may further comprise the step of assigning at least one weight associated with the at least one text term. The method may further comprise the step of forming an input local index of the at least one text term and at least one associated local term weight. The at least one associated local term weight may be determined with reference to a global term index stored in a database. The global term index may comprise a plurality of global text terms and associated global text term weights, The global term index may be formed from a plurality of reference documents. A representation of each of the reference documents may be stored in the database. The method may further comprise the step of querying the database to identify one or more of the reference documents of relevance with respect to the input text portion. The method may further comprise the step of outputting a representation of the identified relevant reference documents.

In an arrangement of the third aspect, there is provided a method for analysing a text portion and retrieving documents relevant to the text portion, the method comprising the steps of:
  a) receiving an input comprising an input text portion;
  b) identifying at least one text term in the text portion;
  c) assigning at least one weight associated with the at least one text term;
  d) forming an input local index of the at least one text term and at least one associated local term weight, wherein the at least one associated local term weight is determined with reference to a global term index stored in a database, the global term index comprising a plurality of global text terms and associated global text term weights, and being formed from a plurality of reference documents, wherein a representation of each of the reference documents is stored in the database;

e) querying the database to identify one or more of the reference documents of relevance with respect to the input text portion; and f) outputting a representation of the identified relevant reference documents.

The representation of each of the plurality of reference documents stored in the database may comprise either the reference document or a link thereto. The representation may further comprise a respective local reference term index for each reference document.

The representation of each of the plurality of reference documents stored in a database may comprise a representative text string derived from the text portion of each reference document and a respective local reference term index.

A plurality of text terms may be identified in the text portion. Each of the plurality of text terms may be assigned at least one associated local term weight. The associated local term weight(s) may be determined with reference to the global term index.

Step (b) may comprise parsing of the text portion to identify the at least one or plurality of text terms.

In step (e), the relevant reference documents may be determined from a comparison of the input local index with each of the plurality of reference local indexes associated with each respective reference document.

In step (e), the relevant reference documents may be determined from at least one intersection of the at least one or plurality of text terms of the input text portion with one or more terms in the local reference term index associated with each reference document.

The weights may be assigned to each of the at least one or plurality of text terms in accordance one or more parameters selected from the group of: word rarity; punctuation; capitalisation; word sequence; combinations of terms; or the number of words in each term.

The representation of the identified relevant reference documents may comprise a representative text string derived from the text of each of the identified relevant reference documents. The representative text string from each document may comprise a selected number of text words before and/or after one or more selected relevant text terms with significant weights.

The method of the third and fourth aspects may be adapted to obtain information from, for example, external data source(s) with respect to one or more of the displayed documents. The method may further comprise the step of re-forming the input local term index on the basis of the information from the external data source(s). The external data source(s) may comprise the internet including for example internet accessible database(s) and/or internet web page(s), news information source(s), financial and/or stock information source(s), scientific information source(s), professional society information source(s), and the like, and may be primary, secondary and/or tertiary information source(s).

The method of the third and fourth aspects may further and/or alternatively comprise the step of displaying the relevant reference documents on a user interface. The user interface may be provided on a client device. The user interface may comprise means for receiving user input with respect to each of the displayed reference documents. Examples of suitable client device may be personal computers, digital assistants, personal digital assistants, cellular phones, mobile phones, smart phones, pagers, digital tablets, laptop computers, Internet appliances, and other processor-based devices. The client device may be a general purpose computer or portable computing device.

The client device, in general, comprises a processor to executed computer instructions stored in computer readable storage medium such as random access memory and/or read only memory coupled to the processor. Such processors may include a microprocessor, an ASIC, and state machines. Such processors include, or may be in communication with, media, for example computer-readable media, which stores instructions that, when executed by the processor, cause the processor to perform the steps described herein. The computer readable media may comprise a program for performing the step of the method(s) disclosed herein, said program controlling the operation of a data processing apparatus on which the program executes to perform the steps of the method(s). Examples of suitable computer-readable media may include, but, are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The client device may further comprise a data connection for transmitting or carrying instructions to a computer for example connection to a network e.g. a local area network, or wide area network or the internet. In other arrangements an intranet may be used. The data connection may be a wireless data connection using a suitable wireless connection protocol. In further arrangements, methods according to the present invention may be performed in a single computing device.

The method may further comprise the step of accepting user input via the user interface on a client device with respect to one or more of the displayed documents. The method may further comprise the step of re-forming the input local term index on the basis of the user input.

Alternatively, the method may further comprise the step of obtaining information from, for example, external data source(s) with respect to one or more of the displayed documents. The method may further comprise the step of re-forming the input local term index on the basis of the information from the external data source(s). The external data source(s) may comprise the internet including for example internet accessible database(s) and/or internet web page(s), news information source(s), financial and/or stock information source(s), scientific information source(s), professional society information source(s), and the like, and may be primary, secondary and/or tertiary information source(s).

The method may further comprise the step of, on the basis of the re-formed input local term index, querying the database to identify one or more relevant reference documents of enhanced relevance to the input text portion. The method may further comprise the step of outputting a representation of the further identified reference documents of enhanced relevance.

In a further arrangement of the third aspect, the method may further comprise the step of g) displaying the relevant reference documents on a user interface, the user interface comprising input means for receiving user input with respect to each of the displayed reference documents; h) accepting user-input with respect to one or more of the displayed documents; i) re-forming the input local term index on the basis of the user input; j) on the basis of the re-formed input local term index, querying the database to identify one or more relevant reference documents of enhanced relevance to the input text portion; and k) outputting a representation of the further identified reference documents of enhanced relevance.

In an arrangement, the re-forming of the input local term index in step (i) may comprise re-assigning the input local text term weights of the input text terms which also appear in each of the reference documents for which user-determined input is received. In this arrangement, step (j) may comprise, on the basis of the re-assigned input local text term weights, querying the database to identify one or more relevant reference documents of enhanced relevance to the input text portion.

In step (g), the user input means may be a means for assigning positive and negative relevance weights with respect to each displayed reference document. The weighting may be a positive weighting or a negative weighting. Where one or more of the plurality of weightings is a negative weighting for a selected global text term, the selected global text term may be assigned a zero weighting. Alternatively, the weighting may be selected from a graduated scale of weightings from positive to negative, for example from a scale comprising for instance the graduated weightings: (very bad)-(bad)-(neutral)-(good)-(very good).

The arrangements of the third aspect may comprise repeating steps (h) to (k), thereby identifying and outputting one or more relevant further documents of increased enhanced relevance in respect of the relevant text terms in the text portion.

The arrangements of the third aspect may comprise repeating steps (h) to (k) on the reference documents with enhanced relevance to identify and output reference documents with additional enhancement of relevance.

The additional relevance information may comprise either a positive indication of relevance of a document. The particular document or a negative indication of relevance of a particular document, or representation of the additional relevance information may be selected from a graduated scale ranging from positive to negative, for example from a scale comprising for instance the graduated weightings: (very bad)-(bad)-(neutral)-(good)-(very good), or some other similar scale which may comprise more or less scale graduations.

For each reference document for which a positive indication of relevance is received, the associated weighting of each of the input text terms in the input local index which also appear in the local text term index of the positively-identified reference document may be increased by a predetermined amount. The predetermined amount may be a multiplier applied to the index term weight. The multiplier may be a number greater than one. The multiplier may be a number between 1 and 10000 or more. The multiplier may be a number between 1 and 1,000, 1 and 500, 1 and 100, 1 and 50, 1 and 40, 1 and 30, 1 and 20, 1 and 10, 1 and 5 and may be, for example, 1, 1.5, 2, 2.5, 3, 3.5, 4, 4.5, 5, 6, 7, 8, 9, 10, 20, 30, 40, 50, 100, 200, 300, 400, 500, 1000, 2000, 3000, 4000, 5000, 6000, 7000, 8000, 9000 or 10000. Particular text terms may appear in a plurality of reference documents. The multiplier may depend on the number of reference documents which receive a positive indication and in which a particular text term appears. For instance, a particular text term appears in only one document which receives a positive indication, the multiplier applied to the text term may be a first multiplier. If the particular text term appears in two documents, the multiplier applied to the text term may be a second multiplier greater than the first multiplier. Similarly, if the particular text term appears in the documents, the multiplier applied to the text term may be a third multiplier greater than the second multiplier, and so on. As an example, the multiplier may be 2 for one document with positive indication, 4 for two documents, 8 for three documents, etc. Other multipliers may of course be used, and the particular multiplier values may be dynamic, for example taking into account factors such as user interaction, heuristic analysis, data obtained from external information source(s), or other factors as would be appreciated by the skilled addressee.

For each reference document for which a negative indication of relevance is received, the associated weighting of each of the input text terms in the input local index which also appear in the local text term index of the negatively-identified reference document may be decreased by a predetermined amount. In particular arrangements, for each reference document for which a negative indication of relevance is received, the associated weighting of each of the input text terms in the input local index which also appear in the local text term index of the negatively-identified reference document may be decreased to a value of zero. The predetermined amount may be a multiplier applied to the index term weight. The multiplier may be zero such that a selected term has no relevance to subsequent interactions. In alternate arrangements, the multiplier may be a value between 0 and 1 such that the text term has a reduced weighting, which would act to give the text term a reduced influence on subsequent calculations and matching queries, but still retains some influence for subsequent queries of the database to identify the one or more relevant reference documents of enhanced relevance to the input text portion.

Where a selected text term appears in one or documents which receive a positive indication of relevance, and the selected text term also appears in one or documents which receive a negative indication of relevance, the associated weighting of the selected text term in the input local index may be updated based on a combination of the positive and negative indications.

Where the selected text term appears in one or documents which receive a positive indication of relevance, and the selected text term also appears in an equal number of documents which receive a negative indication of relevance, the associated weighting of the selected text term in the input local index may be unchanged.

In an arrangement, the re-forming of the input local term index in step (i) may comprise forming an augmented input local term index on the basis of text terms in the local term index of reference documents receiving a positive indication of relevance. In this arrangement, step (j) may comprise, on the basis of the input local text term weights in the augmented input local text term index, querying the database to identify one or more relevant reference documents of enhanced relevance to the input text portion.

For each reference document for which a positive indication of relevance is received, terms in the positively identified reference document which do not appear in the input local term index may be added thereto to form the augmented local text term index together with associated local index text term weights determined.

The text portion may be a text string comprising a plurality of text words. The text portion may be a text document. The text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report.

The reference documents may be text documents representative of a document selected from one or more of the group of a book; an article; a text record; a certificate; an agreement; a contract; a manuscript; a paper; a scientific paper; a patent specification; an employment advertisement; a legal transcript; a legal document; or a news report. Each of the reference documents may be assigned a document relevance score representative of the relevance to the input text portion.

According to a fourth aspect, there is provided a method for refining the results of a search. The search results may comprise a representation of a selected plurality of reference documents. The reference documents displayed may be of relevance to an input text portion comprising one or more search terms. The selected plurality of reference documents may comprise a subset of a plurality of documents in a database. The method may comprise the step of forming a local term index from the search terms. The local term index may comprise one or more text terms. Each local text term may be associated with a local text term weight. The method may further comprise the step of receiving and displaying the search results on a user interface. The user interface may be provided on a client device as disclosed above and comprise means for receiving user input with respect to each one or more of the plurality of the displayed reference documents. The method may further comprise the step of accepting user input on one or more of the displayed reference documents. The method may further comprise the step of re-forming the input local term index on the basis of the user input. The method may further comprise the step of, on the basis of the re-formed input local term index, querying the database to identify one or more documents of enhanced relevance to the search terms. The method may further comprise the step of outputting a representation of the further identified reference documents of enhanced relevance.

In an example arrangement of the fourth aspect, there is provided a method for refining the results of a search, the search results comprising a representation of a selected plurality of reference documents, such reference documents displayed being of relevance to an input text portion comprising one or more search terms, the selected plurality of reference documents comprising a subset of a plurality of documents in a database, the method comprising the steps of:
a) forming a local term index from the search terms, the local term index comprising one or more text terms, each local text term associated with a local text term weight;
b) receiving and displaying the search results on a user interface, the user interface comprising input means for receiving user input with respect to each one or more of the plurality of the displayed reference documents;
c) accepting user input on one or more of the displayed reference documents;
d) re-forming the input local term index on the basis of the user input;
e) on the basis of the re-formed input local term index, querying the database to identify one or more documents of enhanced relevance to the one or more search terms; and
f) outputting a representation of the further identified reference documents of enhanced relevance.

In step (d), the re-forming of the input local term index may comprises the step of (d.1) re-assigning the input local text term weights of the input text terms which also appear in each of the reference documents for which user-determined input is received; and wherein step (e) may comprise the step of (e.1) on the basis of the re-assigned input local text term weights, querying the database to identify one or more relevant reference documents of enhanced relevance to the input text portion.

In step (a), the local text term weights for each of the local text terms may be equal. In step (a), the local text term weights for each of the local text terms may be derived from a global text term index. The global text term index may comprise a plurality of text terms associated with global text term weights. In particular arrangements, the global text term weights may be derived from text term analysis of a plurality of documents.

In step (d), the re-forming of the input local term index may comprise the step of (d.2) forming an augmented input local term index on the basis of text terms in the local term index of documents receiving a positive indication of relevance; and wherein step (e) may comprise the step of (e.2) on the basis of the input local text term weights in the augmented input local text term index, querying the database to identify one or more relevant reference documents of enhanced relevance to the input text portion.

For each reference document for which a positive indication of relevance is received, new terms in the positively identified reference document which do not appear in the local term index may be added thereto to form the augmented local text term index and associated local index text term weights for the new terms are determined.

For each reference document for which a negative indication of relevance is received, terms in the negatively identified reference documents which do not appear in the local term index down-weighted in subsequent searches/queries of the database such that they are less likely to be involved in a match to determine a relevant document. This may be achieved by modifying the weighting of the text terms which appear in negatively identified documents by a multiplier, for example a value between 0 and 1 to reduce the weighting and thus reduce the impact the text term has in determining relevant documents. This may also utilise a multiplier, for example a value between 0 and 1, to reduce the weighting.

According to a fifth aspect, there is provided a system for refining the results of a search. The search results may comprise a representation of a selected plurality of documents of relevance to one or more search terms. The selected plurality of documents may comprise a subset of a plurality of documents in a database. The system may comprise means for forming a local term index from the search terms. The local term index may comprise one or more text terms. Each local text term may be associated with a local text term weight. The system may further comprise means for receiving and displaying the search results on a user interface. The user interface may be provided on a client device as disclosed above and may comprise means for receiving user input with respect to each of the displayed reference documents. The system may further comprise user input means for accepting user input on one or more of the displayed documents. The system may further comprise processing means for analysing the user input re-forming the input local term index on the basis of the user input. The system may further comprise query means for querying the database on the basis of the re-formed input local term index to identify one or more documents of enhanced relevance to the input text portion. The system may further comprise output means for outputting a representation of the further identified reference documents of enhanced relevance.

In a particular example arrangement of the fifth aspect, there is provided a system for refining the results of a search, the search results comprising a representation of a selected plurality of documents of relevance to one or more search terms, the selected plurality of documents comprising a subset of a plurality of documents in a database. The system may comprise:

means for forming a local term index from the search terms, the local term index comprising one or more text terms, each local text term associated with a local text term weight;

means for receiving and displaying the search results on a user interface, the user interface comprising input means for receiving user input with respect to each of the displayed reference documents;

user input means for accepting user input on one or more of the displayed documents;

processing means for analysing the user input re-forming the input local term index on the basis of the user input;

query means for querying the database on the basis of the re-formed input local term index to identify one or more documents of enhanced relevance to the input text portion; and output means for outputting a representation of the further identified reference documents of enhanced relevance.

According to a sixth aspect there is provided a system for analysing an input text portion and retrieving documents relevant to the text portion. The system may comprise input means for receiving an input comprising an input text portion. The system may further comprise identification means to identify at least one text term in the text portion. The system may further comprise assignment means for assigning at least one weight associated with the at least one text term. The system may further comprise indexing means for forming an input local term index of the at least one text term and at least one associated local term weight. The at least one associated local text term weights may be determined with reference to a global term index stored in a database. The global term index may comprise a plurality of global text terms and associated global text term weights, and being formed from a plurality of reference documents. A representation of each of the reference documents may be stored in the database. The system may further comprise query means for querying the database to identify one or more relevant reference documents with respect to the input text portion. The system may further comprise output means for outputting a representation of the identified relevant reference documents.

In an example arrangement of the sixth aspect, there is provided a system for analysing an input text portion and retrieving documents relevant to the text portion, the system comprising: input means for receiving an input comprising an input text portion; identification means to identify at least one text term in the text portion; assignment means for assigning at least one weight associated with the at least one text term; indexing means for forming an input local term index of the at least one text term and at least one associated local term weight, wherein the at least one associated local text term weight(s) is determined with reference to a global term index stored in a database, the global term index comprising a plurality of global text terms and associated global text term weights, and being formed from a plurality of reference documents, wherein a representation of each of the reference documents is stored in the database; query means for querying the database to identify one or more relevant reference documents with respect to the input text portion; and output means for outputting a representation of the identified relevant reference documents.

In a particular arrangement, the representation of each of the plurality of reference documents stored in the database may comprise either the reference document or a link thereto.

The representation may further comprise a respective local reference term index for each reference document.

In a further particular arrangement, the representation of each of the plurality of reference documents stored in the database may comprise a representative text string derived from the text portion of each reference document. The representation may further comprise a respective local reference term index.

A plurality of text terms may be identified in the text portion. Each of the plurality of text terms may be assigned at least one associated local term weight determined with reference to the global term index.

The system of the sixth aspect may further comprise display means for displaying the relevant reference documents on a user interface. The user interface may be provided on a client device as disclosed above. The user interface may comprise means for receiving user input with respect to each of the displayed reference documents. The system may further comprise user input means accepting user-input on one or more of the displayed documents. The system may further comprise processing means for analysing the user input and re-forming the input local text term index. The system may further comprise query means for querying the database on the basis of the re-formed input local text term index to identify one or more relevant reference documents of enhanced relevance to the input text portion. The system may further comprise means for outputting a representation of the further identified reference documents of enhanced relevance.

In a further example arrangement of the sixth aspect, the system may comprise: display means for displaying the relevant reference documents on a user interface, the user interface comprising input means for receiving user input with respect to each of the displayed reference documents; user input means accepting user-input on one or more of the displayed documents; processing means for analysing the user input and re-forming the input local text term index; query means for querying the database on the basis of the re-formed input local text term index to identify one or more relevant reference documents of enhanced relevance to the input text portion; and means for outputting a representation of the further identified reference documents of enhanced relevance.

The re-forming of the input local term index may comprise re-assigning the input local text term weights of the input text terms which also appear in each of the reference documents for which user-determined input is received. In addition, the querying of the database on the basis of the re-formed input local text term index may comprise, on the basis of the re-assigned input local text term weights, querying the database to identify one or more relevant reference documents of enhanced relevance to the input text portion.

In other arrangements, the re-forming of the input local term index may comprise forming an augmented input local term index on the basis of text terms in the local term indexes of documents receiving a positive indication of relevance. In addition, the querying of the database on the basis of the re-formed input local text term index comprises: oh the basis of the input local text term weights in the augmented input local text term index, querying the database to identify one or more relevant reference documents of enhanced relevance to the input text portion.

According to a seventh aspect, there is provided a computer readable medium comprising a program for analysing a text portion and retrieving documents relevant to the text portion, the program controlling the operation of a data processing apparatus on which the program executes to perform the steps of:

a) receiving an input comprising an input text portion;
b) identify at least one text term in the text portion;
c) assigning at least one weight associated with the at least one text term;
d) forming an input local index of the at least one text term and at least one associated local term weight, wherein the at least one associated local term weight is determined with reference to a global term index stored in a database, the global term index comprising a plurality of global text terms and associated global text term weights, and being formed from a plurality of reference documents, wherein a representation of each of the reference documents is stored in the database
e) querying the database to identify one or more of the reference documents of relevance with respect to the input text portion; and
f) outputting a representation of the identified relevant reference documents.

In particular arrangements, the program may additionally execute to perform the further steps of:
g) displaying the relevant reference documents on a user interface, the user interface comprising input means for receiving user input with respect to each of the displayed reference documents;
h) accepting user-input with respect to one or more of the displayed documents;
i) re-forming the input local term index on the basis of the user input;
j) on the basis of the re-formed input local term index, querying the database to identify one or more relevant reference documents of enhanced relevance to the input text portion; and
k) outputting a representation of the further identified reference documents of enhanced relevance.

According to an eighth aspect, there is provided a computer readable medium comprising a program for refining the results of a search, the search results comprising a representation of a selected plurality of reference documents, such reference documents displayed being of relevance to an input text portion comprising one or more search terms, the selected plurality of documents comprising a subset of a plurality of documents in a database, said program controlling the operation of a data processing apparatus on which the program executes to perform the steps of:
a) forming a local term index from the search terms, the local term index comprising one or more text terms, each local text term associated with a local text term weight;
b) receiving and displaying the search results on a user interface, the user interface comprising input means for receiving user input with respect to one or more each of the plurality of the displayed reference documents;
c) accepting user input on one or more of the displayed documents;
d) re-forming the input local term index on the basis of the user input;
e) on the basis of the re-formed input local term index, querying the database to identify one or more documents of enhanced relevance to the input text portion; and
f) outputting a representation of the further identified reference documents of enhanced relevance.

In any one of the above aspects and/or arrangements, further information may be obtained from, for example, external data source(s) with respect to one or more of the reference document which forms the result of a search query. The further information may be utilised to re-form the input local term index on the basis of the information from the external data source(s). The external data source(s) may comprise the internet including for example internet accessible database(s) and/or internet web page(s), news information source(s), financial and/or stock information source(s), scientific information source(s), professional society information source(s), and the like, and may be primary, secondary and/or tertiary information source(s).

In any one of the above aspects and/or arrangements, the text portion may be a text string comprising a plurality of text words. The text portion may be a text document. The text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report. The text portion may comprise a large number of words, for example up to or more than 5 words, up to or more than 10, up to or more than 20; up to or more than 50, up to or more than 100, up to or more than 500, up to or more than 1000, up to or more than 5000, up to or more than 10000, up to or more than 20000, up to or more than 50000, up to or more than 100000, up to or more than 250000, up to or more than 500000, or up to or more than 1000000 or more words.

In any one of the above aspects and/or arrangements, a plurality of text terms may be identified in the text portion. Each of the plurality of text terms may be assigned at least one associated local term weight. The at least one or plurality of text terms may comprise single word terms within the input text portion. The relevant terms may comprise double-word terms within the input text portion. The at least one or plurality of text terms may comprise triple-word terms within the input text portion. The text portion may comprise a large number of text terms, for example up to or more than 5 text terms, up to or more than 10, up to or more than 20, up to or more than 50, up to or more than 100, up to or more than 500, up to or more than 1000, up to or more than 5000, up to or more than 10000, up to or more than 20000, up to or more than 50000, up to or more than 100000, up to or more than 250000, up to or more than 500000, or up to or more than 1000000 or more text terms, and may depend on available processing capabilities.

BRIEF DESCRIPTION OF THE DRAWINGS

Arrangements of the invention will now be described, by way of an example only, with reference to the accompanying drawings wherein.

DETAILED DESCRIPTION

Figure 1:
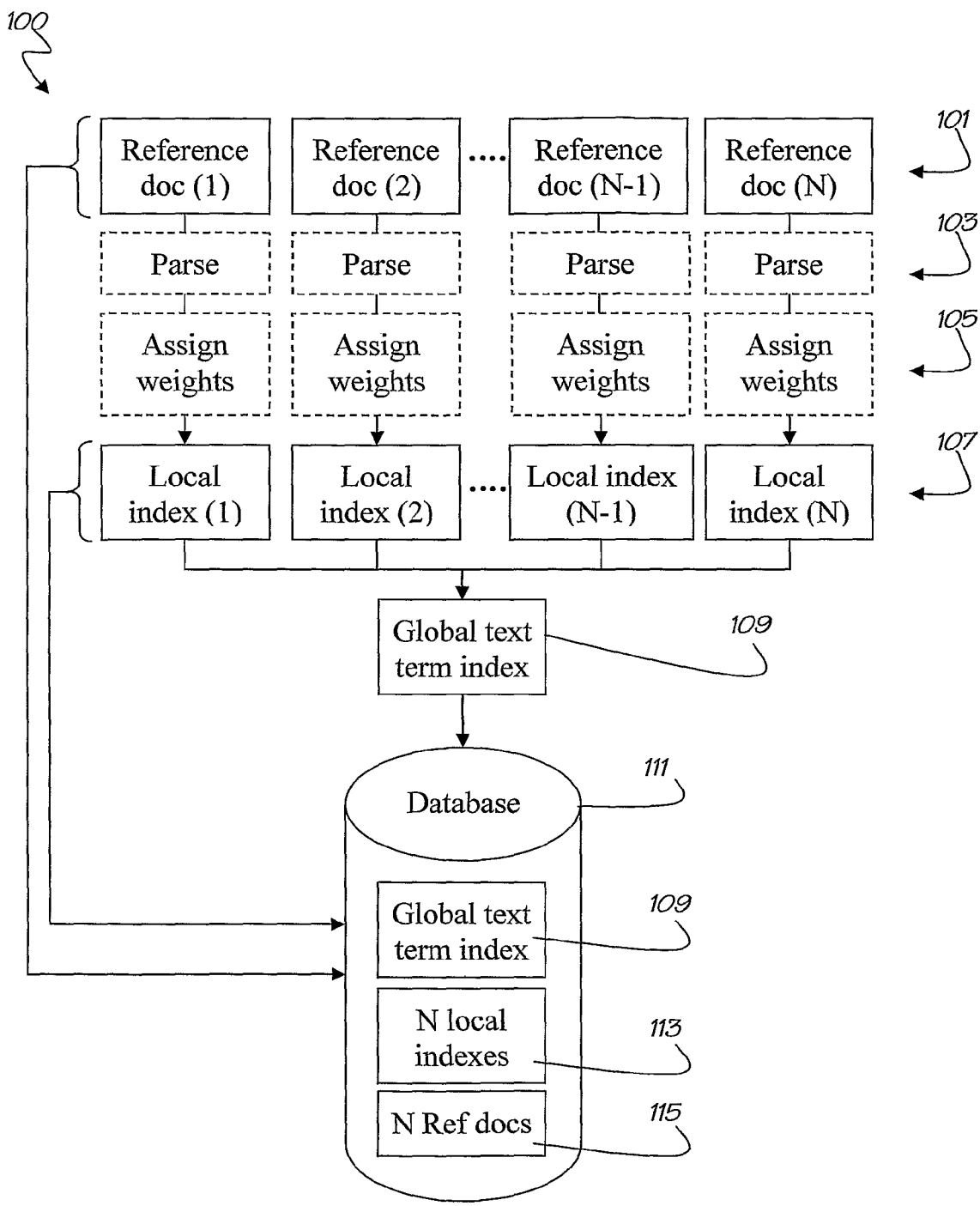
FIG. 1 is a schematic representation of a method for analysing a one or more reference documents according to arrangements of the present invention disclosed herein.

Aspects and arrangements of the present invention will be described more fully hereinafter with reference to the accompanying drawings, in which example arrangements of the invention are shown. The aspects and/or arrangements of the present invention may, however, be arranged in many different forms and should not be construed as limited to the arrangements set forth herein. Rather, the presently described arrangements are provided to provide a thorough disclosure to convey the scope of the invention envisaged to the skilled addressee in the field of the art. In the description of the figures herein, like numbers refer to like elements and/or features.

The methods and systems disclosed herein provide a new approach to document to document based searching. The search methods solve several key issues surrounding result relevance, database compatibility, speed and efficiency of the search.

In general, there are several key components that enable the systems disclosed herein to achieve these goals. The first component to the present search methodology is the parsing of the document input into a form suitable for database searching. This differs to standard searching methodologies mainly due to the sheer size of the input text (i.e. obtained from an input document), but also because the relevance calculation is far more efficient if the input is analysed prior to the actual search. The second is the ability for the system to learn and improve based on instant interaction with the user and previous interactions with result sets.

In order to improve the relevance of the results, the presently disclosed methods and systems use a method of weighting input text terms based on their appearance in both a local (in the input document) and global (all documents in the database) context. This weighting methodology allows the search to quickly quantify the relevance of the result set in real time. The global index creates a lookup providing information on how valuable a particular text term is relative to other text terms. This value can be due to many factors, such as rareness of the terms, appearance in previously positive/negative results, etc. This global index is continually updating, adjusting and improving its own scoring methodology based on individual searches and user interactions with the system. The local score is combined with the global score to calculate the overall importance of the input text terms from the input document in the search. Local weighting also takes into account different factors, for example, the number of times the text terms appear in the document, the location in the document, the punctuation, capitalization, or formatting, among many others. In particular arrangements, the presently disclosed search methodology is essentially looking for intersections between two documents (common or equivalent terms) and then applies appropriate weighting to value these intersections. The result is a relative relevance score, which can be used to order the result set.

Broadly, the presently described systems and methods utilise intersections between text terms of an input document or text portion and a plurality of reference documents stored in a database to determine, at least initially, a sub-set of those reference documents which appear to be relevant (e.g. contextually) to the input document. The use of such intersections is valuable when there are a large number of input terms, say in an input document with a large amount of text which needs to be analysed and compared with each of the reference documents to determine relevant matches.

As the number of documents in the system gets large, it becomes increasingly difficult, however, to use intersections alone to determine a good match. For example, internet searches using search engines such as Google™ will typically result in millions of documents (web pages) with intersecting terms to the few input search terms. In the face of this large number of search results, how do you decide relevance? As the number of intersections increases, in general the relevance increases, but for a low number of search terms and a large number of possible results, this ratio is almost impossible to rely on for relevant results. When looking at a small number of input terms, additional information to that of the search terms themselves is required to find more relevant results. To do this, the methods and systems disclosed herein incorporate user interactions with the search results directly to determine how to expand the input text information, for example to add additional terms or to increase or decrease the relative importance of certain terms using dynamic weighting systems. Disclosed herein, therefore are systems and methods for analysis input search terms, and matching the input search terms with relevant information stored in a database, but also methods and systems for dynamically improving the relevance of the search results based on user interactions, both positive and negative. Furthermore, the relevance of the search results may also be improved by obtaining further information with respect to the documents which forms the result of a search query, for example, from external data source(s). The further information may be utilised to re-form the input local term index on the basis of the information from the external data source(s). The external data source(s) may comprise the internet including for example internet accessible database(s) and/or internet web page(s), news information source(s), financial and/or stock information source(s), scientific information source(s), professional society information source(s), and the like, and may be primary, secondary and/or tertiary information source(s).

As the presently described search methodologies and systems do not inherently rely on meta data (although such systems can be readily incorporated for improved results) but only portions (i.e. slabs) of text, it is compatible with any system or application which uses documents of any size that include text. Any document or batch of documents can be readily added to the system, and this has many advantages for applications such as job searching, where jobs are advertised on many different sites, each with their own data design structure. The same is true for many other applications for example large legal databases with varying structure, or research journal articles, where different journals often have slightly different format structures. Of course, the presently disclosed systems are also readily adapted to applications where the general format of the documents used in the search and stored in the database have a largely similar structure, for example that of patent specification databases.

Referring to FIG. 1, there is provided a method 100 or indexing a plurality of reference documents 101 and storing the index (and other information) in a database 111. In the method, a plurality of N reference documents 101 is provided, each document comprising a text portion, which are desired to be indexed for future search functions. The method comprises the initial step of parsing 103 the text portion of each of the plurality of documents 101. The parsing operation is adapted to identify at least one, typically a plurality of text terms in the text portion of each document 101. The text terms may comprise single-word terms, and/or multiple word terms. The multiple word terms may comprise terms with two, three, four, five or more words. In practice, it is found the multiple-word text terms of up to three words (i.e. sing- double- and triple-word terms) provide a suitable balance between required processing power and indexing capability of the database.

The text portion in each of the documents 101 may be a text string comprising a plurality of text words, or the text portion may be a text document. Alternatively, the text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report, or other similar item comprising text.

The reference documents 101 may each be text documents, or documents comprising a text portion, and may be representative of a document selected from one or more of the group of a book; an article; a text record; a certificate; an agreement; a contract; a manuscript; a paper; a scientific paper; a patent specification; an employment advertisement; a legal transcript; a legal document; a news report, or other similar document comprising text.

Once the text terms are identified, they are each assigned 105 a weight. In the basis case, the weight for each term may be the same (e.g. set to a value of "1"), wherein there is no bias to the importance or relevance of any of the text term.

Alternatively, the weighting associated with each text term may comprise a combination of a plurality of weightings, each associated with each text term identified in each respective document 101. One or the plurality of weightings may be determined with respect to one or more parameters, and the parameters may relate to features of each term in relation to the particular text portion in the document. For example, the parameters may be selected from, among others: the number of times a particular term appears in a single document; the position of the text term in a document; the capitalisation of the term; punctuation surrounding the term; words in the text portion adjacent to the term; word rarity; word sequence; combinations of text terms; or the number of words in each text term. In other arrangements, the weighting for each text term may be a user-defined weighting derived from a user input or other suitable parameters as would be appreciated by the skilled addressee.

The text portion may be a text string comprising a, plurality of text words. The text portion may be a text document. The text portion may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report.

The reference documents may be text documents representative of a document selected from one or more of the group of: a book; an article; a text record; a certificate; an agreement; a contract; a manuscript; a paper; a scientific paper; a patent specification; an employment advertisement; a legal transcript; a legal document; or a news report. Each of the reference documents may be assigned a document relevance score representative of the relevance to the input text portion.

The method 100 next comprises forming a plurality of respective local document indexes 107, wherein each local document index is associated with a respective document 101. Each local document index 107 comprises the (plurality) of local text term(s) contained in each associates respective document 101 and the local weighting associated with each text term in respect of the associated document. Each of the documents 101 and its associated local index 107 is stored in the database for later search and retrieval operations as discussed below.

In a particular simple example arrangement, considering for example only a single parameter such as the number of times a particular term appears in an associated reference document, the local text term weights may be calculated from the relation:

$$S_L = \left(1 + \frac{N_L - 1}{x}\right) \quad (1)$$

where $S_L$ is the local weight for a particular term in a document which occurs $N_L$ times in that document. Equation (1) would apply to all text terms regardless of the number of words in each term. The factor x is an arbitrary factor which may be used to scale the local term weighting as required. The local weights $S_L$ for each text term in each document, is stored in the local index for each respective document. The local term weight calculation may be the same regardless of the text portion or document, i.e. whether that document is a reference document stored in a database, or an input text portion or document uploaded by a user, the local term weight calculations may in each case be determined by using Equation (1).

The method 100 further comprises the step of forming a global document index 109 from the plurality of local document indexes 107. The global document index 109 comprises a plurality of global text terms contained in each of the plurality of documents 101 and a global weighting associated with each global text term. In particular arrangements, the global weighting associated with each of the global text terms may be determined with respect to a parameter associated with a reference global text term. For example, a parameter which may be useful in determining the global weighting may be how popular a particular term is across all the documents in the database with respect to the most popular useful text term. The most popular useful text term may be arbitrarily defined, but in general will relate to the term with the highest incidence occurrence across all the reference documents in the database, from which useful relevance information can be obtained. Such a reference term therefore can not be a very common word that does not supply any relevance or context information in isolation, thus simple connective words (e.g. "the", "in", "at", "by", "a" etc) would not normally be selected as a reference term.

For example, in particular arrangements, each text term is assigned a weight or score which is related to how rare the word is relative to the other terms in the system. Typically, the higher the weighting, the better quality of term i.e. the more context information which can be determined about a document containing that text term. To avoid extremely rare terms from disproportionately influencing the searching capabilities of the system, terms which appear in only a relatively few documents (e.g. one or two documents in all the reference documents) are generally not considered. This also has the effect that spelling errors of terms, where exact replicas of such errors would occur in only a small percentage of the reference documents, will typically not be deemed by the system to, be a unique term which conveys a particular context to the document it appears in. Alternatively, the system may record these extremely rare terms and/or terms with spelling errors, but may assign a zero weighting to them. In a particular example using online job advertisements from Australian websites in 2009, it was found that approximately 60% of useful single-word terms, 75% of useful double-word terms, and 88% of useful triple-word terms occurred in less than 3 documents, therefore, significantly decreasing the total number of useful text terms that were required to be able to provide sufficiently relevant context information about the requirements for each advertisement. Similarly, text terms which occur in too many documents, for example greater than a particular percentage, e.g. greater than 10%, or greater than 15%, greater than 20%, greater than 25% or higher, are determined to be too common to provide sufficiently unique contextual information and such text terms also may be given a global weight of zero.

In an example arrangement, the global index may comprise single-word, double-word, and triple-word text terms. The global weighting $S_{G1}$ for each single-word text term in the database may be determined by the relation:

$$S_{G1} = y\left(1 - \frac{N_{G1} \cdot y}{M_{R1}}\right) \cdot \frac{A_{G1}}{z} \qquad (2)$$

where $N_{G1}$ is the number of distinct documents that contain the single-word text term one or more is times, and $M_{R1}$ is the total number of reference documents that the most popular useful single-word text term appears in. In other arrangements, for example where the total number of documents is small, $N_{G1}$ may alternatively refer to the total number of occurrences of the text term across all documents. Similarly, $M_{R1}$ may alternatively relate to the total number of occurrences of the most popular single-word term across all documents. The parameter, y, may be an arbitrary parameter which may be adapted in accordance with requirements, for example, for calculation efficiency optimisation (say, for example to keep the global weighting within a certain value range or to avoid floating point operations which require additional memory and processing requirements).

The parameter $A_{G1}$ is an optional parameter which may be utilised by a system administrator to add and additional weighting to a particular single-word text term, for example, on inspection of the term, the system administrator may determine that a particular term may be more or less relevant to a particular database, and may weight the term accordingly. The parameter, z, may be used to modify the administrator parameter $A_{G1}$ for the desired effect. As an example, both parameters $A_{G1}$ and z may be initialised to a value of 50, and the administrator may supply an administrator weighting $A_{G1}$ in the range of between 0 and 100. Therefore, terms with $A_{G1}>50$ (good term) gain an increased global weight and terms with $A_{G1}<$ (bad term) gain a decreased global weight. text terms with $A_{G1}=50$ would be neutral terms with no additional up- or down-weighting applied. In alternative arrangements, the administrator weight $A_{G1}$ may be determined dynamically through utilisation of the system by users, for example using learning algorithms, or neural network arrangements, to increase or decrease the relevance of particular text terms based on actual user interactions with the system.

For double and triple-word terms, the global weighting may be determined, not simply by the occurrences of the particular double- or triple-word combination, but also by the global weightings of each word which make up the multi-word text term. For example a global double word term G2 may be formed from two global single word terms G1A and G1B. For example, a potential means for determining the double-word text term weighting may be simply an averaging of the two single-word terms which make up the double-word term. Alternatively, similarly to Equation (2), the global double-word term may be assigned a global weighting $S_{G2}$ using the relation:

$$S_{G2} = y\left(1 - \frac{1}{2} \cdot \left[\frac{S_{G1A} + S_{G1B}}{2} + \frac{N_{G2} \cdot y}{M_{R2}}\right]\right) \cdot \frac{A_{G2}}{z} \qquad (3)$$

where $[(S_{G1A}+S_{G1B})/2]$ is the average global score for the two single word terms, $N_{G2}$ is the number of distinct documents that contain the double-word text term one or more times, and $M_{R2}$ is the total number of reference documents that the most popular useful double-word text term appears in. Again, $A_{G2}$ is an optional parameter which may be utilised by a system administrator or dynamic algorithms to add and additional weighting to a particular double-word text term. Also, as before, in alternate arrangements, $N_{G2}$ may alternatively refer to the total number of occurrences of the double-word term across all documents. Similarly, $M_{R2}$ may alternatively relate to the total number of occurrences of the most popular double-word term across all documents.

Similarly again, a global triple-word text term comprises two double-word text terms, and a potential means for determining the triple-word text term weighting may be simply an averaging of the two double-word terms which make up the triple-word term. Alternatively, the global triple-word term weighting may be determined using the relation $$S_{G3} = y\left(1 - \frac{1}{2} \cdot \left[\frac{S_{G2A} + S_{G2B}}{2} + \frac{N_{G3} \cdot y}{M_{R3}}\right]\right) \cdot \frac{A_{G3}}{z} \qquad (4)$$

where $[(S_{G2A}+S_{G2B})/2]$ is the average global score for the two double-word terms, $N_{G3}$ is the number of distinct documents that contain the triple-word text term one or more times, and $M_{R3}$ is the total number of reference documents that the most popular useful triple-word text term appears in. Again, $A_{G3}$ is an optional parameter which may be utilised by a system administrator or dynamic algorithms to add and additional weighting to a particular triple-word text term. This methodology can be extended beyond triple word terms to quadruple word terms, or to as many terms as desired. In practice, however, it has been found that little value is obtained beyond triple word combinations for the comparatively high computational effort. Also, as before, in alternate arrangements, $N_{G3}$ may alternatively refer to the total number of occurrences of the triple-word term across all documents. Similarly, $M_{R3}$ may alternatively relate to the total number of occurrences of the most popular triple-word term across all documents.

The global weighting associated with each of the global text terms may be determined with respect to a plurality of parameters, each parameter being associated with a respective reference global text term. The global weighting associated with each of the global text terms may be further determined with respect to the number of documents in which each global text term appears across all the plurality of documents.

The global weighting associated with each of the global text terms may be determined with respect to the number of reference documents in which the text term appears. The global weighting associated with each of the global text terms may be further determined with respect to user interactions, for example as part of a machine learning or neural network arrangement as would be appreciated by the skilled addressee.

As above, the global text term weightings may be derived from a plurality of parameters including, for example: the number of times the term appears in all the plurality of documents; the number of times a particular term appears in a single document; the position of the text term in a particular document; the capitalisation of the term; punctuation surrounding the term; words in the text portion of a particular document adjacent to the term; word rarity, either in particular document(s) or across the plurality of all documents; word sequence; combinations of text terms; the number of documents the term appears in; or the number of words in each text term. In other arrangements, the weighting for each text term may be a user-defined weighting derived from a user input or other suitable parameters as would be appreciated by the skilled addressee.

The local and/or global text term weighting may either be a positive weighting or a negative weighting. In particular arrangements, where one or more of the plurality of weightings is a negative weighting for a selected global text term, the selected global text term may be assigned a zero as weighting, or alternatively a weighting between 0 and 1, so that the term still has an influence in determining subsequent results (i.e. documents of enhanced relevance to the input text terms or search terms), but this influence is reduced. The user-defined weighting may be derived from self-learning system comprising a plurality of user-defined weightings for a selected global text term.

EXAMPLE 1

As an example of the above determination of text term weightings, consider two reference documents which respectively contain the following text portions:
Reference Document 1: "The quick brown fox jumped over the lazy dog"
Reference Document 2: "The slow brown fox jumped over the lazy cat"

For the purpose of this example we will not throw any terms away due to low numbers. The global index of single-word terms for the database would therefore be:

| Single-word text term | Number of occurrences, $N_{G1}$ |
|---|---|
| the | 2 |
| quick | 1 |
| slow | 1 |
| brown | 2 |
| fox | 2 |
| jumped | 2 |
| over | 2 |
| lazy | 2 |
| dog | 1 |
| cat | 1 |

Therefore, $M_{G1}=2$ as the most number f documents the any single-word text term appears is 2. Using Equation (1) (with $y=1000$, $z=50=A_{G1}$), the local term scores (weights) for each of the single word terms would be:

| Term | Calculation | Term Weight, $S_{G1}$ |
|---|---|---|
| the | 1000 − (2 * 1000)/2 | 0 |
| quick | 1000 − (1 * 1000)/2 | 500 |
| slow | 1000 − (1 * 1000)/2 | 500 |
| brown | 1000 − (2 * 1000)/2 | 0 |
| fox | 1000 − (2 * 1000)/2 | 0 |
| jumped | 1000 − (2 * 1000)/2 | 0 |
| over | 1000 − (2 * 1000)/2 | 0 |
| lazy | 1000 − (2 * 1000)/2 | 0 |
| dog | 1000 − (1 * 1000)/2 | 500 |
| cat | 1000 − (1 * 1000)/2 | 500 |

If an administrator determines that the term "dog" is bad, and "fox" is good, or such a determination is made, for example, by heuristics or analysis of user inputs over time, then the weights for the single word terms "fox" and "dog" are re-weighted as follows:

| Term | Calculation | Term Weight, $S_{G1}$ |
|---|---|---|
| fox | 500 * (100/50) | 1000 |
| dog | 500 * (0/50) | 0 | thus, the bad term "over" which does not add any significant contextual information to the documents, will not have an effect on searches of these two reference documents, whereas the good term "fox" which adds significant context, will have a large influence on the results of searches where an input text portion contains the single word term "fox".

EXAMPLE 2

A further example illustrating the above determination of text term weightings, consider the following input document:

Input Document: "The red car"

being compared to documents in a database which comprises the three documents:

Reference Document A: "The blue car"

Reference Document B: "The red truck"

Reference Document C: "The blue truck"

The global term scores, term occurrences, and local term scores for the input document and each of the reference documents after parsing is shown in Table 1 below, which is a representation of the scores before any user interaction has occurred. Also shown in Table 1 is the match score comparing the input document to each of the reference documents.

It can be seen from the match score in Table 1 that Reference Document B is found to be the best match to the input document.

Reference Document C only has the term "the" intersecting with the input document, but since this term is so popular, Reference Document C scores zero in the Match Score and is determined to not be of relevance to the input document.

TABLE 1

Match Scores Before User Interaction

| Term | No. Docs | Global Score | Occurrence of Term in Document | | | | Local Scores (Term weight) | | | | Match Score | | |
|---|---|---|---|---|---|---|---|---|---|---|---|---|---|
| | | | Input | A | B | C | Input | A | B | C | A | B | C |
| the | 3 | 0 | 1 | 1 | 1 | 1 | 0 | 0 | 0 | 0 | 0 | 0 | 0 |
| red | 1 | 0.6667 | 1 | 0 | 1 | 0 | 0.667 | 0 | 0.667 | 0 | 0 | 0.667 | 0 |
| car | 1 | 0.6667 | 1 | 1 | 0 | 0 | 0.667 | 0.667 | 0 | 0 | 0.667 | 0 | 0 |
| the red | 1 | 0.6667 | 1 | 0 | 1 | 0 | 0.667 | 0 | 0.667 | 0 | 0 | 0.667 | 0 |
| blue | 2 | 0.3333 | 0 | 1 | 0 | 1 | 0 | 0.333 | 0 | 0.333 | 0 | 0 | 0 |
| the blue | 2 | 0.3333 | 0 | 1 | 0 | 1 | 0 | 0.333 | 0 | 0.333 | 0 | 0 | 0 |
| blue car | 1 | 0.6667 | 0 | 1 | 0 | 0 | 0 | 0.667 | 0 | 0 | 0 | 0 | 0 |
| the blue car | 1 | 0.6667 | 0 | 1 | 0 | 0 | 0 | 0.667 | 0 | 0 | 0 | 0 | 0 |
| truck | 2 | 0.3333 | 0 | 0 | 1 | 1 | 0 | 0 | 0.333 | 0.333 | 0 | 0 | 0 |
| red truck | 1 | 0.6667 | 0 | 0 | 1 | 0 | 0 | 0 | 0.667 | 0 | 0 | 0 | 0 |
| the red truck | 1 | 0.6667 | 0 | 0 | 1 | 0 | 0 | 0 | 0.667 | 0 | 0 | 0 | 0 |
| blue truck | 1 | 0.6667 | 0 | 0 | 0 | 1 | 0 | 0 | 0 | 0.667 | 0 | 0 | 0 |
| the blue truck | 1 | 0.6667 | 0 | 0 | 0 | 1 | 0 | 0 | 0 | 0.667 | 0 | 0 | 0 |
| Max. documents | 3 | | | | | | | | Final match score | | 0.667 | 1.333 | 0 |

Lets say now that the user indicates via a user interface that Reference Document B is not a good match, but the Reference Document A is a good match.

TABLE 2

Match Scores After User Interaction

| | | | | | | | | User Interactions Positive Negative | | | | A 1 0 | B 0 1 | C 0 0 |
|---|---|---|---|---|---|---|---|---|---|---|---|---|---|---|
| Term | No. Docs | Global Score | Occurrence of Term in Document | | | | Local Scores (Term weight) | | | | Match Score | | |
| | | | Input | A | B | C | Input | A | B | C | A | B | C |
| the | 3 | 0 | 1 | 1 | 1 | 1 | 0 | 0 | 0 | 0 | 0 | 0 | 0 |
| red | 1 | 0.6667 | 1 | 0 | 1 | 0 | 0.667 | 0 | 0.667 | 0 | 0 | 0.333 | 0 |
| car | 1 | 0.6667 | 1 | 1 | 0 | 0 | 0.667 | 0.667 | 0 | 0 | 1.333 | 0 | 0 |
| the red | 1 | 0.6667 | 1 | 0 | 1 | 0 | 0.667 | 0 | 0.667 | 0 | 0 | 0.333 | 0 |
| blue | 2 | 0.3333 | 0 | 1 | 0 | 1 | 0 | 0.333 | 0 | 0.333 | 0 | 0 | 0 |
| the blue | 2 | 0.3333 | 0 | 1 | 0 | 1 | 0 | 0.333 | 0 | 0.333 | 0 | 0 | 0 |
| blue car | 1 | 0.6667 | 0 | 1 | 0 | 0 | 0 | 0.667 | 0 | 0 | 0 | 0 | 0 |
| the blue car | 1 | 0.6667 | 0 | 1 | 0 | 0 | 0 | 0.666 | 0 | 0 | 0 | 0 | 0 |
| truck | 2 | 0.3333 | 0 | 0 | 1 | 1 | 0 | 0 | 0.333 | 0.333 | 0 | 0 | 0 |
| red truck | 1 | 0.6667 | 0 | 0 | 1 | 0 | 0 | 0 | 0.666 | 0 | 0 | 0 | 0 |
| the red truck | 1 | 0.6667 | 0 | 0 | 1 | 0 | 0 | 0 | 0.667 | 0 | 0 | 0 | 0 |
| blue truck | 1 | 0.6667 | 0 | 0 | 0 | 1 | 0 | 0 | 0 | 0.667 | 0 | 0 | 0 |
| the blue truck | 1 | 0.6667 | 0 | 0 | 0 | 1 | 0 | 0 | 0 | 0.667 | 0 | 0 | 0 |
| Max. documents | 3 | | | | | | | | Final match score | | 1.333 | 0.667 | 0 |

It can be seen that, as a result of the user interaction, the final match scores of Reference Documents A and B are reversed, reflecting the user's contextual information, i.e. in this example, that the user is interested in documents which relate to cars rather to trucks.

This is a simple example to illustrate how the refinement process can quickly change the algorithm context to produce results closer to the desired output of the user. Those skilled in the art would appreciate that this same process applied to many documents, each with many more terms and significantly more complex local and global indexes can produce results with substantially improved relevance and context than algorithm only approaches.

System Infrastructure

Figure 2A:
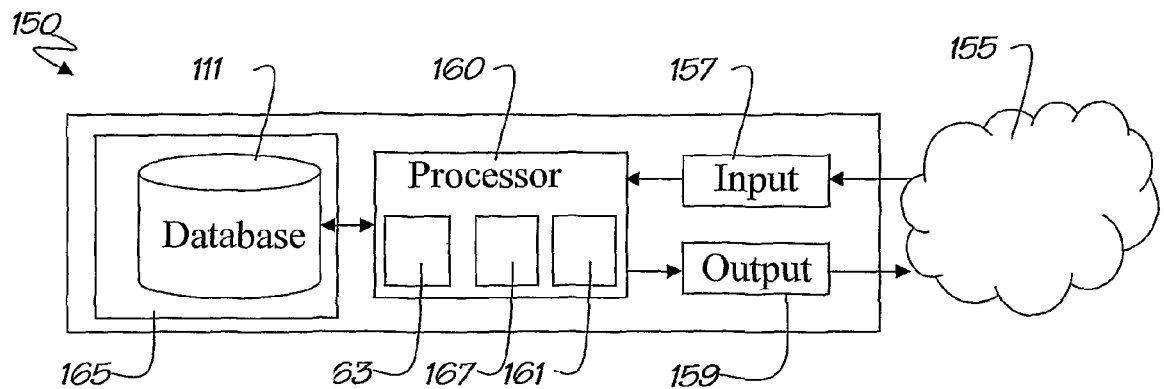
FIGS. 2A and 2B are schematic representations of systems according to arrangements of the present invention disclosed herein.

Referring now to FIG. 2A, there is provided a system 150 for indexing a plurality of documents 101. The documents may be obtained from a data source 155 which may interface with the system 150 though input 157 and output 159 modules of the system 150. The data source 155 may be a database of documents, where each document comprises a text portion. Alternatively, the data source may be a dynamic environment, for example the internet or a selected portion of a network such as the internet, for example one or more sources or related documents comprising text portions (e.g. employment advertisement sources, patent sources, news sources etc). The system may be adapted to periodically poll the data source 155 for new or related documents to be indexed by the system 150.

The system comprises a processor 160. The processor 160 is adapted to receive documents to be indexed from the data source 155 via the input module 157. In particular arrangements, the processor comprises at least a parsing module 161 for parsing the text portion of each of the plurality of documents retrieved from the data source 155 to form a plurality of respective local document indexes each associated with a respective document. The local document indexes formed by parsing module 161 for each document will in general comprise a plurality of local text terms contained in the document and a local weighting associated with each text term.

The processor 161 of the system 150 further comprises an analysis module 163 for analysing the plurality of local document indexes formed in parsing module 161 and forming a global document index from the plurality of local document indexes. The global document index in general comprises a plurality of global text terms contained in the plurality of documents retrieved from data source 155. The global document index further comprises a global weighting associated with each global text term. The global weighting associated with each of the global text terms is typically be determined with respect to at least one parameter associated with a reference global text term; The global document index may be stored in the database and related to each of the local document indexes.

The system 150 further comprises a database 111 which is adapted for storing at least a representation of each of the local document indexes in a memory 165 of the system 150. The database 111 may further be adapted for storing in memory 165 at least a representation of the global document index and also at least a representation of each of the documents indexed. The representation of the documents indexed, may in some cases be a copy of the document itself, or alternatively, the representation of each indexed document may be a selected portion of the document or alternatively still information on how the document may be retried (for example, as a hypertext link to a document residing on the internet, or a directory tree location for a document residing on a computer system).

The system 150 may be provided as a virtual system, for example as part of a distributed computing platform, sometimes known as a cloud computing system, and by utilising such a distributed computing platform, the software and infrastructure to perform the methods described herein may be offered as a service to user(s) and/or provider(s). The virtual system may form part of a virtualized logical server cloud of logical servers to physical resources (for example, as described in U.S. Pat. No. 6,880,002). The system 150 therefore may comprise a plurality of like virtual systems 150 embodied in one or more physical systems and logically interconnected for transparency and scaling on an on-demand basis. In this arrangement, each system 150 comprises database 111, which may be a subset of the entire database across all such systems.

Implementation of a cloud-based infrastructure may be particularly useful in managing scalability issues as the system matures and usage/adoption of the systems increases, which places an increasing load upon individual processing units.

For example, the total set of reference documents may be partitioned and distributed across a plurality of systems, each similar to that of system 150 depicted in FIG. 2A. In this arrangement, database 111 of each of the plurality of systems 150 may, rather than comprising all the reference documents, may comprise a sub-set only of the total number of reference documents. Queries may then be distributed across each of the plurality of systems 150. The search query is then sent to each of the plurality of systems 150 wherein the respective processor module processes the query as above and searches all the documents stored on the respective database partition (i.e. similar to database 111 but only comprising a subset of the total number of reference documents) for similar documents as above. Each respective worker system 150 then outputs all document matches and match scores etc indicating the relevance or quality of the match, and the match results from each of the plurality of systems is collated and ordered for presentation to the user. Alternatively, still, it will be readily appreciated that the partitioned arrangement described above has inherent advantages as the total number of documents increases, particularly in relation to the speed with which queries may be implemented and search results retrieved. It is expected that in this particular arrangement the total number of reference documents may be scaled significantly with little or no appreciable degradation in the speed with which query results may be obtained, the primary limitation being in the collation of the query results from the multiple worker systems prior to final presentation to the user, rather than in the searching of an ever increasing pool of reference documents.

One particular scalability issue which may be encountered may that of too many reference documents i.e. where the quantity of reference documents exceeds a threshold were by a matching database query cannot be performed on the entire pool of documents. This may be overcome in a number of ways. Firstly, the pool of reference documents is divided into separate servers and the query is performed on each server, and the best results from each collated as discussed above. The division of the document pool can be decided based on a random algorithm, spatial location, time of day, or other manual or automatic process that optimally balances the load. The division of reference documents can be adjusted after the fact to improve the balance. Furthermore, sampling can also be employed to counteract large numbers of reference documents. For instance, it is recognised that the goal of the initial match and iterative matches is to construct a theme of terms with weightings to best represent the document and the submitter's intention. A sample of the pool of reference documents can be maintained such that it is large enough to be representative of the entire pool, yet small enough to be feasibly queried by a single or multiple servers. Once the theme is satisfactorily built, further meta-data can be used to reduce the entire document pool sufficiently to make it manageable for a query to be performed on the subset of all reference documents.

As an alternative, the database may be substituted for a file-based storage system equivalent or partitioned arrangement spread across multiple worker systems as described above. In these arrangements, queries are able to be distributed as widely as required and is very effective in overcoming the issue of large volumes of reference documents.

A further scalability issue which may arise is that the calculations on reference documents in the database to determine create and update the global term index, i.e. to calculate (or re-calculate) the popularity of a term based on new reference documents added to the database and assign relevant weighting(s) to the term, may become too expensive computationally to be performed in real-time. Assuming a large enough pool of reference documents to be considered representative of the population of potential documents, it is recognised that the popularity of individual terms only changes gradually with time, for example reflecting changes in trends & terminology. The recalculation of the global index and relevant term weights (i.e. term popularity) can then be processed offline by one or more dedicated worker processors and the results updated with a frequency selected to best reflect changes in trends & terminology, for example hourly, daily, weekly, fortnightly, monthly, quarterly, etc.

Figure 2B:
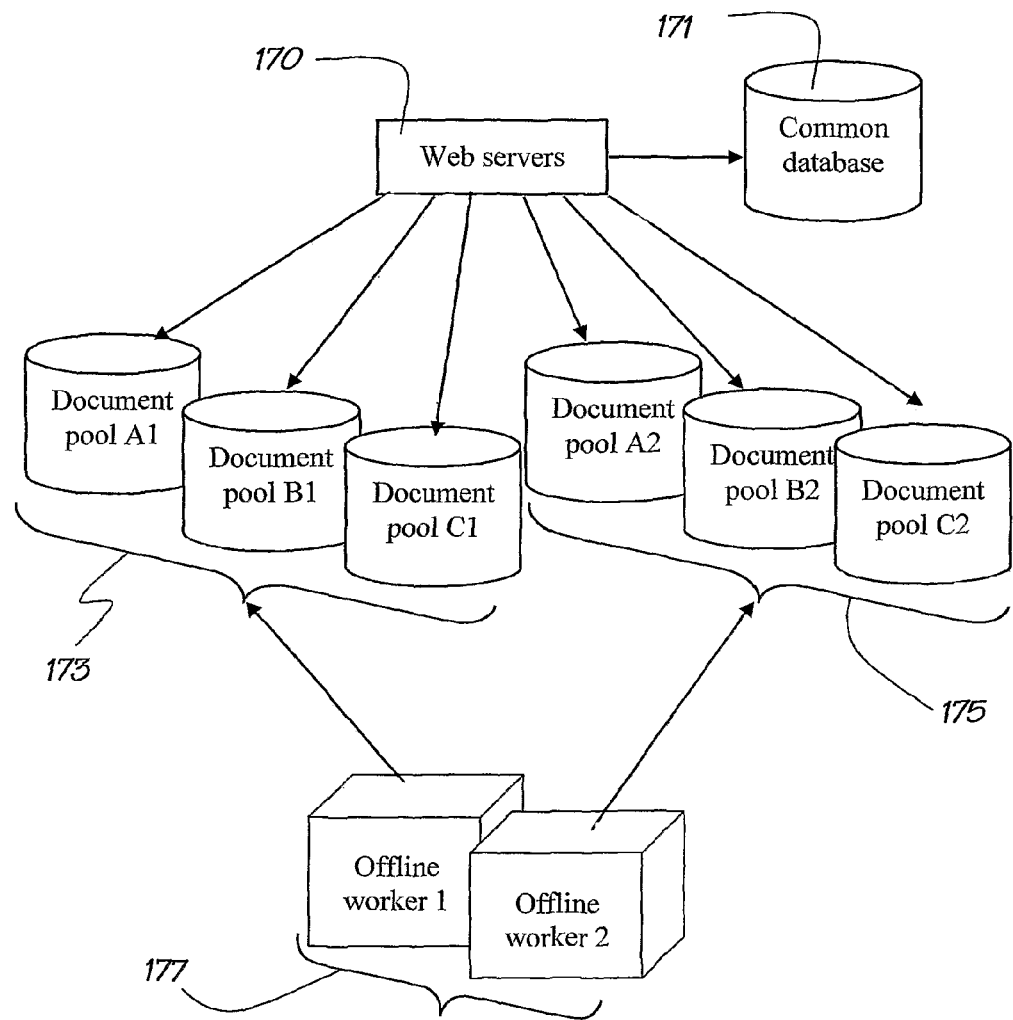

A further scalability problem which may arise is that of too many legitimate requests, where the number of current users exceeds a threshold that can be feasibly managed by a single server. This may be countered by using duplicate worker processors. For instance, the database(s) of reference documents can be duplicated across multiple servers to perform the matching queries. The user initially arrives to the system via a single common point of entry, and this point of entry can then issue the queries in a distributed manner across the multiple servers using a suitable load balancing algorithm. FIG. 2B shows a schematic representation of the a particular arrangement of the system infrastructure should all the countermeasures discussed above be employed. Web servers 170 are used to provide the front-ends (heads) which present a user interface to accept input documents/search terms and to directs query requests to the pool of reference documents as appropriate. A common database 171 may be used, which may be accessed by the web server(s) 170 to store user data. The reference documents may be stored in a plurality of databases 173, 175 XY where X indicates the divided segment of the pool (for the division of documents countermeasure above), and Y indicates the replication of document pool X for load balancing (the duplicate worker processors countermeasure above). Note if the sampling countermeasure is employed only a single document pool X may be required. The server may communicate with a client device suitable for providing the user interface and the user may interact with the server via the user interface on the client device.

Offline workers/processors 177, where there may be one, two, three, or a plurality (i.e. tens, hundreds, or thousands as required) of such workers, provide offline processing capabilities for calculation/re-calculation of the global index (i.e. determining term popularity of all text terms in the reference documents in the document pool(s)) which may be used on demand. Offline workers 177 may also be used for analytic analysis for example of trends in the reference documents and/or user queries.

In a further arrangement of the system of FIG. 2B, comprising several document pools (i.e. 173 and 175) which can be mirrored, the document pools themselves may be implemented as several logical partitions. In this arrangement, these logical partitions (and therefore pools) can be mirrored as would be appreciated by the skilled addressee. Also in this arrangement, the worker nodes 177 may be adapted to host the instances of the document pool partitions.

In this arrangement a given document pool can be split across multiple workers, such that the document pools may be implemented as partitions of associated documents. Each partition then only requires a global document index, i.e. the set of terms, comprising a global weighting associated with each global text term contained in each of the sub-set of documents which are stored on that particular partition. In this way, a complete match calculation can be made against an input document with all the reference documents contained in the partition of associated documents.

This arrangement has particular advantage in that parallel processing techniques may be readily employed in that a particular input document may be analysed against each of the sub-set of reference documents stored on each logical partitions in a readily scalable parallel manner. Therefore, as the number of reference documents increases, additional worker processor units may be added, each comprising a partition with an optimised number of reference documents, and a respective global document index for the documents on each partition, and the document matching process may be spread evenly across each of the workers and partitions. The document matches from each partition may then be collated and presented to the user transparently, such that there is no indication that the document matches have been received from multiple sources, i.e. multiple worker units.

Analysis and Document Relevance Matching

Figure 3:
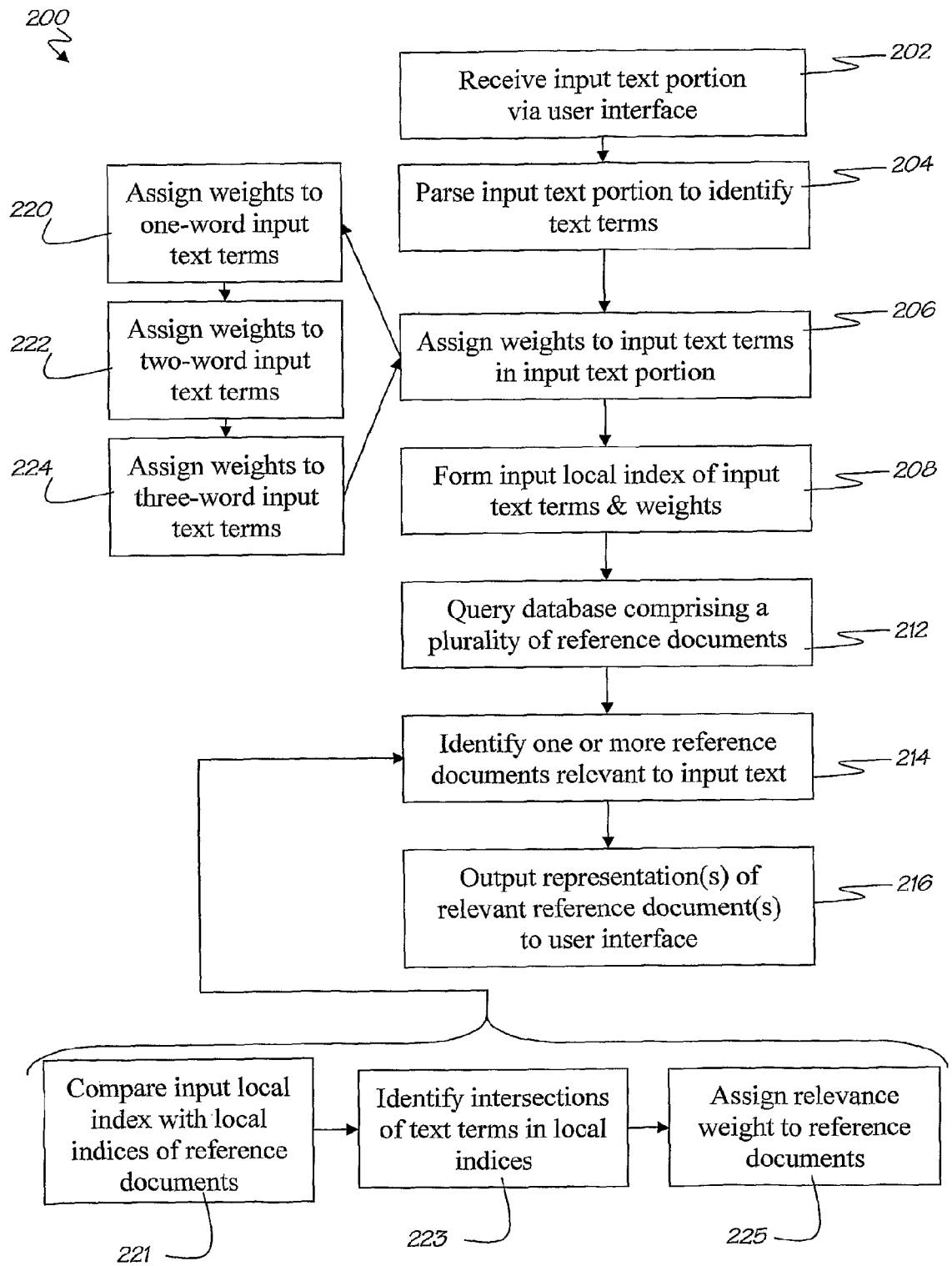
FIG. 3 is a schematic representation of a method for analysing a text portion and retrieving documents relevant to the text portion according to arrangements of the present invention.

Disclosed herein is a method 200 for analysing a text portion and retrieving documents relevant to the text portion, depicted schematically in FIG. 3. In the presently described arrangement of method 200, the method comprises the step of receiving 202 via a user interface an input comprising an input text portion. The user interface may be provided on a client device as disclosed above. The input may be a text document comprising the text portion. The text portion may be received by an input means (e.g. input module 157 of system 150 depicted in FIG. 2A).

The user interface may be any suitable user interface adapted to receive information from a user, including being adapted to upload the text portion for analysis and initiate analysis on the text portion for the purpose of finding documents relevant to the text portion. The user interface is adapted to display information to the user as a result of the analysis i.e. a representation of documents which are deemed by the analysis to be of relevance to the text portion. The user interface may further be adapted to receive additional information from the user in relation to the relevance of the documents deemed by the analysis to be relevant to the text portion and to initiate a further analysis based on the additional user information. The user interface may for example be provided as a portal site, which may be accessible over a network such as a LAN or WAN such as for example the internet.

The method further comprises the step of identifying 204 at least one text term in the text portion. Alternatively, a plurality of text terms may be identified in the text portion. The at least one or plurality of text terms may be identified by parsing the text portion to identify the at least one or a plurality of text terms and extract from the text portion the text terms.

The identified text term(s) may comprise one or more of single word terms, double-word terms and/or triple-word terms within the input text portion, or alternatively text terms with more than three words (e.g. four, five, six, seven, eight, nine, ten or more words as required).

The parsing of the text portion may be performed by a parsing module (e.g. parsing module 161 of system 150) in a processor 160. The method may further comprise the step of assigning 206 at least one weight associated with the at least one (or plurality of) text term(s). The parsing module may comprise identification means to identify text terms in the input text portion thereby to parse the text portion. The parsing module may further comprise assignment means for assigning at least one weight associated with the at least one text term and each of the plurality of text terms may be assigned at least one associated local term weight. The assigning of weights to the text terms may comprise assigning weights to each multi-word term identified (220, 222, 224), and may for example be determined using Equation (1) above. Further still, the parsing module may also comprise indexing means for forming an input local term index of the at least one text term and at least one associated local term weight. The at least one associated local term weight may be determined with reference to a global term index stored in a database 111. The parsing of the input text portion to identify text terms therein may be performed using text parsing methods as would be appreciated by the skilled addressee. The parsing may optionally include one or more of the following steps: analysing and/or removing punctuation marks in the input text portion, e.g. to use such punctuation to identify text terms; analysing and/or removing capitalisation of text; analysing paragraph structure; analysing sentence structure, analysing heading structure; determining the number of times particular text structures (e.g. words, combinations of words, acronyms, synonyms, etc) appear in a single document; plural forms of words (and reducing such plural forms to their base word); the position of the particular text structures in the text portion; analysing words in the text portion adjacent to the particular text structures; word rarity of particular words and or text structures in the text portion; determining and analysing word sequencing.

In a particular example, the parsing may be performed by initially converting the text portion to a desired format for further processing. A particular example of such a format is an XHTML compliant string although the skilled addressee would appreciate that many other formats are also applicable. The text portion may be converted to such an XHTML compliant string by any means, and a variety of such means would be appreciated by the skilled addressee. The parsing may then be performed on the XHTML string according to a defined set of rules for example, for example, by the following method:

Traverse though every XHTML node in the string:
if the node is an <a> tag with an "href" attribute add the value of the attribute as a link;
if the node is in a blacklist (i.e. list of XHTML tags that should be removed along with everything contained with in—for example a <style> tag contains cascading style sheet information that is not relevant to parsing) remove it and all it's children;
if the node is not in a whitelist (i.e. a list of XHTML tags that are relevant to our parsing such as headings, bold, italics etc) remove it but preserve and promote it's children;
when XHTML tags are not in either the black list OR the white list, remove the tag but leave it's children intact. An example of this is a <center> tag which centres it's children. It has no relevance to the parsing process so it is removed. The reason for this technique of using the black & white list in this way is that there are a lot of XHTML tags, some of which are specific to certain web-browsers. The list of ones to totally ban (black list) is quite small, the list of ones that are relevant (white list) is quite small, but the list of everything that are to be ignored is very large.
if the node is text then parse from left to right attempting to match a series of ordered regular expressions;
if an email address is found, add it to the document meta data, but do not add it as a term;
if a phone number is found add it to meta data associated with the document, but do not add it as a text term;
if a current figure or range is found, depending on the context of the reference document (e.g. scientific article, job advertisement etc) add it to the meta data associated with the document, but do not add it as a term;
if a URL is found add it to the document meta data, but do not add it as a text term;
Otherwise consider it a word as a candidate for being a term:
Reduce the word to it's core version (e.g. by removing word stems e.g. such as -s, -es, -ing-, etc);
Identify synonyms, acronyms, homographs etc and reduce to a single core version of the terms;
Remove all XHTML attributes;
Apply additional filters for example, meta-data or, if the particular pool of documents uses particular linguistic syntax, then these may also be taken into account as term of increased importance to that document pool.

Regarding the identification and reduction of synonyms, homographs (also known as heteronyms) and/or acronyms to core versions of the terms to determine context, this may also include identification and characterisation of branching terms it appears that the have multiple contexts.

Generally, the difference between the handling of synonyms and homographs is that synonyms group terms, whereas homographs split terms into sub-terms, and the parsing module may be adapted to simply the handling of these term forms in this manner.

For example, the term "hat"—relating to a head covering—may have sub-term branches (a) and (b) depending whether the term "red hat"—relating to a computer operating system—also appears in the document being parsed. This branching analysis may optionally form part of the document parsing, i.e the method could determine that the term "hat" should be stored as "hat-(a)" or "hat-(b)", which are essentially different terms as far as the system is concerned. Optionally the document being parsed may search for "hat", "hat(a)" and "hat(b)", but weight them differently. Alternatively, the parsing method may compute that, for example, the term "red hat" is a special subset of "hat" if the percentage of times that the term "red" prefaces "hat" is significant. Then, if a document has "red hat", then the term "hat" on it's own may be significantly downweighted or ignored completely so that matching documents will need to have the specific term "red hat", rather than simply "hat".

Handling of homographs may be more difficult as the context in which the homograph is used must also be determined, however, the detection of adjectives or verbs in the parsing of the document will assist significantly. Otherwise the parsing must also consider other words in the document. Alternatively, the parsing module may comprise a list of common homographs and if such a term is found, the parsing module may consult the list either to assist in the determination of context (i.e. the list may comprise common terms often found in conjunction with the homograph term in a particular context), or the parsing module could simply treat the homograph terms as common words and either significantly downweight or ignore these terms completely. A further alternative for parsing a document comprising homographs is to look for top associated terms, but then take the associated top terms and look at their inter-association. If top associated terms have no association with each other, then they are likely to be indicative of different context with the parent term. Once the system determines what those words are, it can look for them when the parent term occurs to determine which context to look for. When a parent term has multiple contexts (effectively children), as the parent term value should be worth less by itself, unless a child exists to indicate understanding of the context. Additionally, user interactions to deduce the context will also provide significant information in the determination of context, particularly in relation to homographs, since they should appear in a disproportionate amount of negative interactions and be down-weighted accordingly such that only the relevant contextual meaning of the homograph in question in which the user in interested will factor in the search results presented after re-forming of the index and refinement of the search results as described herein.

The above method is provided as an example only and many alternate steps may be added and steps may be optional, depending on the particular application of the method and the context of the documents being parsed.

The method 200 of the present arrangement further comprises the step of forming an input local index 208 of the at least one text term and at least one associated local term weight. The input local term index 208 may comprise a plurality of text terms and associated text term weights.

The method 200 further comprises the step of querying 212 the database 111 to identify 214 one or more of the reference documents of relevance with respect to the input text portion. The querying of the database may be performed in a processor 160 and may be performed in a match module 167 of processor 160. The database comprises a global term index comprising a plurality of global text terms and associated global text term weights. The global term index may be formed from a plurality of reference documents and a representation of each of the reference documents may be stored in the database 111. The representation of each of the plurality of reference documents stored in the database 111 may comprise either the reference document or a link thereto. The representation of the reference document may further comprise the respective local reference term index for each reference document. Alternately, the representation of each of the plurality of reference documents stored in the database 111 may comprise a representative text string derived from the text portion of each reference document and a respective local reference term index.

In step 214, for identifying the one or more reference documents relevant to the input text, the relevant reference documents may be determined from a comparison 221 of the input local index (e.g. local index 107(1) of reference doc 101(1) as depicted in FIG. 1) with each of the plurality of reference local indexes associated with each respective reference document. The relevant reference documents may be determined by identifying intersections 223 of the at least one or plurality of text terms of the input text portion with one or more terms in the local reference term index associated with each reference document, as discussed above. Once the input local index of the input text has been compared with the local indices of the reference documents, each reference document is assigned a relevance weight, where documents with a higher relevance weight are more relevant to the input text. The comparison of the input local index with the local indices my be performed by comparing in the local input index with the global index and determining relevance weights for the reference documents from the comparison with the global term index.

As discussed above, the at least one or plurality of text terms may comprise single word terms, double-word terms, triple-word terms and or terms with higher word counts (four-word-terms, five-word-terms, six-word-terms, etc) within the input text portion.

As will be appreciated, the goal of identifying reference documents of relevance to the input text portion in the matching process is to rank all other documents in order of how similar they are to the subject document. The level of similarity between the input text portion and the reference documents is an indication of how close the context of the reference document matches that of the input text portion and therefore can be used to identify reference documents which are relevant to a specific enquiry by the user based on the text portion input to the system.

In an example arrangement of the system and methods described herein, the number of text terms may be arbitrarily limited to minimise the processing requirement for performing database queries to identify the reference documents of relevance. For instance, in a particular example, the number of single-, double-, and triple-word text terms may be limited to, say, 50, 100, 150, 200, 250, 300, 350, 400, 450, 500 or more terms each (eg. 200 single-word terms, 200 double-word terms, and 200 triple-word text terms), or more. In some arrangements, thousands of each of the single-, double-, and triple-word text terms may be used depending on available processing capabilities. It will become apparent, however, that the continual increasing of more text terms may not necessarily have a corresponding improvement in the quality of the search results with respect to the additional processing power required. It will thus be appreciated that a threshold in the number of text terms used in the search query will be evident, above which, only minimal improvement is obtained, and the additional processing required for additional terms may be unnecessary. This limitation in terms should not be compared to standard input length restrictions of other search systems (such as the character and word limits currently in use by the Google™ search engine), as the limitation is actually based on the quality of the input terms, so the limitation is applied after examining the weightings of all the input terms. In particular examples, e.g. in the field of matching job-seeker resumes with relevant job advertisements, it has been found that using only the top weighted about 200 single-word terms, 200 double-word terms, and 200 triple-word terms are required for each document based on their local term scores to achieve statistically relevant results.

In an example method of indentifying relevant reference documents, the following procedure may be used:
1. Find all documents where the set of single-word terms intersects with the set of single-word terms of the subject document.
2. Sum the local term weights of the intersected set for the subject document separately for single-word, double-word, and triple-word terms.
3. Sum the local term weights of the intersected set for each document separately for single-word, double-word, and triple-word text terms.
4. Average the two score sums separately for single-word, double-word, and triple-word terms.
5. Sum the single-word, double-word, and triple-word terms to find the overall match score for each of the reference documents.

In step (5) above, the single, double and/or triple word terms may be given additional significance by adding a further weight multiplier in the calculation of the final sum (see for example the terms $V_i$ in Equation (5)). This is used in the realisation that the intersection of multiple-word forms between documents provides an increasing indication of relevance (i.e. similar context) as the number of words in the text terms increases. That is, documents which have common/intersecting double word terms are likely to be more relevant than those documents which simply have isolated intersections of the two words forming the double-words term, and further documents having common/intersecting triple-word text terms are likely to be more relevant than those with either isolated intersections of single-word and double-word terms making up the triple-word term.

In a particular arrangement, the relevance of each of the reference documents in the database to that of the input text portion may be determined by calculating a document relevance score, $D_{rel}$(input, reference) which may be determined by the relation:

$$D_{rel}(\text{input, reference}) = V_1 \sum_{S_{G1}} \left( \frac{S_1 + O_1}{2} \right) + V_2 \sum_{S_{G2}} \left( \frac{S_2 + O_2}{2} \right) + V_3 \sum_{S_{G3}} \left( \frac{S_3 + O_3}{2} \right) \quad (5)$$

where $S_1$, $S_2$, and $S_3$, are respectively the single-, double- and triple-word term weights in the input local index (i.e. of the input text portion) which are averaged with the single-, double- and triple-word terms ($O_1$, $O_2$, and $O_3$ respectively) in the local index of each of the reference documents in the database and summed over all terms input local text terms $S_{G1}$, $S_{G2}$, and $S_{G3}$.

Parameters $V_1$, $V_2$ and $V_3$, are respectively an arbitrary additional weighting applied to the sum of the respective single-, double-, and triple word sums to reflect the increased importance that text terms of increasing number of constituent elements (word) makes to the relevance of the document. Typically, $V_1 < V_2 < V_3$, for example, $[V_1=1, V_2=2, V_3=3]$ or $[V_1=1, V_2=4, V_3=8]$ or $[V_1=10, V_2=50, V_3=100]$ or any other suitable values, which may be dependent upon the type of reference document stored in the database, or determined by learning or heuristic processes to achieve the desired results. Once a document relevance score $D_{rel}$(input, reference) has been determined for each document (or a subset thereof) in the database, then the documents are ranked in decreasing order of relevance (i.e. $D_{rel}$(input, reference)) and the ranked list of reference documents is output to the user and displayed on the user interface.

The method 200 further comprises outputting 216 a representation of the identified relevant reference documents to be displayed on the user interface. The representation of the identified relevant reference documents may comprise a representative text string derived from the text of each of the identified relevant reference documents. The representative text string from each document may comprise a selected number of text words before and/or after one or more selected relevant text terms with significant weights. For example, the representative text string may be a portion of text from the reference document in the near vicinity or surrounding one or more of the text terms from the input text portion.

In particular arrangements, the method 200 may comprise a further refinement method 250 providing the ability to refine the search results to increase the relevance of the reference documents displayed to the user based on their specific requirements. The refinement method 250 may utilise input from the user on the relevance of one or more of the documents displayed. This user input may be used to modify the weights of the text terms in the input local index (i.e. re-form the index) so that terms that are more relevant to the users specific enquiry are assigned a higher weight. Therefore, such text terms with modified weights have a greater influence on the relevance weight applied to each of the reference documents in subsequent database queries/searches. Additionally, text terms in the input local index that are less important and/or not relevant to the user's specific enquiry are assigned a lesser weight so that such text terms have little or no influence on the results of any subsequent search. Alternatively, (or additionally) the refinement method 250 may utilise information obtained from, for example, external data source(s) with respect to one or more of the displayed documents, which may be used to modify the weights of the text terms in the input local index (i.e. re-form the index) so that terms that are more relevant to the users specific enquiry are assigned a higher weight. The method may further comprise the step of re-forming the input local term index on the basis of the information from the external data source(s). The external data source(s) may comprise the internet including for example internet accessible database(s) and/or internet web page(s), news information source(s), financial and/or stock information source(s), scientific information source(s), professional society information source(s), and the like, and may be primary, secondary and/or tertiary information source(s).

Figure 4:
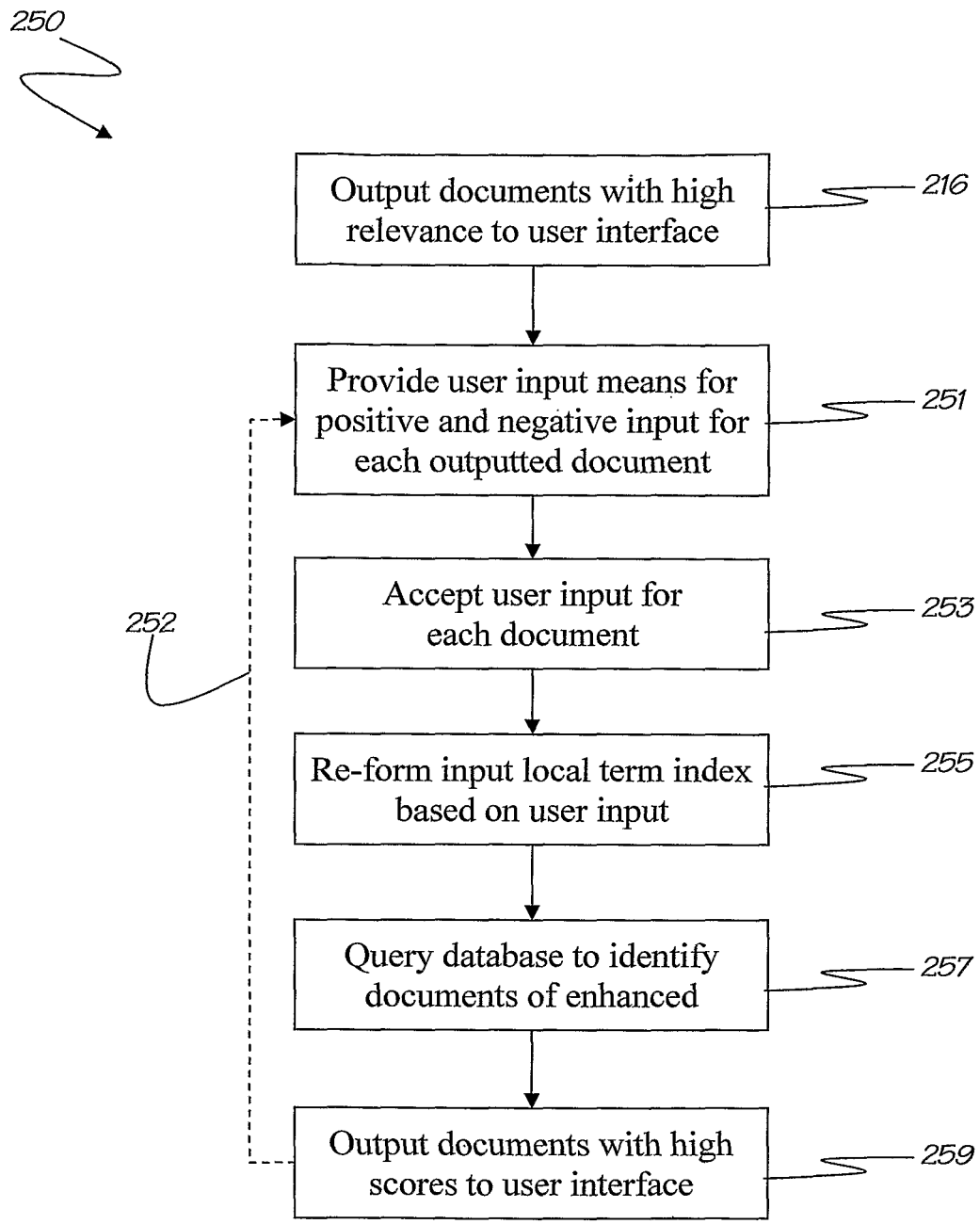
FIG. 4 is a schematic representation of a further refinement method for improving the relevance of the retrieved documents to the text portion using user input and interactions with the results.

An arrangement of the further refinement method 250 using user input and interactions with the results is depicted in FIG. 4. As above, the method 250 comprises the step of displaying 218 the results of a search to find reference documents relevant to an input text portion on a user interface. The user interface may be provided on a client device as disclosed above. The method further comprises providing an input means 251 for the user to interact with the results and provide additional input on the relevance or lack thereof of certain documents retrieved by the search. The user input means may be a means for assigning positive and negative relevance weights with respect to each displayed reference document.

The method further comprises accepting such user-input 253 with respect to one or more of the displayed documents. The user input may be additional relevance information and may comprise either a positive indication of relevance of a particular document or a negative indication of relevance of a particular document, or representation of the document i.e. the user may provide a positive input indicating that one or more of the reference documents are relevant to their current requirements, and/or the user may also provide negative input indicating that one or more of the reference documents are not relevant to their current search needs.

In further arrangements, the system may include a user account system, whereby individual users can create a personal profile on the system, for example via a secure log-in arrangement. The user profile may be adapted to store relevant personal information about each user in a user database, for example, name, address etc, which may be used for metadata input for refining user searches of particular reference document databases as discussed above. The user account may also be adapted to for the user to create one or more search profiles, for example covering topics of interest to the user. Such topics of interest may include one or input documents (i.e. text documents or a collection of search terms) which may be used to periodically query a database of reference documents to periodically search for new or updated reference documents relevant to the input documents. The user account may further still be adapted to record and store in the user database previous user interaction sessions the user may have had in relation to a particular topic of interest, for example, the stored search criteria may include the results of specific text terms which have either been up-weighted or down-weighted on the basis of previous user interactions, so that in subsequent searches, the users preferences are incorporated into the initial search query to minimise the number of reference documents retrieved that are of lesser relevance to the search criteria, and allow the system to present to the user in the initial results a set of reference documents of higher relevance than would normally have been achieved without the knowledge of the user's preferences.

In a particular example arrangement, the refined document relevance score $R_{rel}$(input, reference) may be determined by the relation:

$$R_{rel}(\text{input, reference}) = V_1 \sum_{S_{G1}} \left( \frac{S_1 + O_1}{2} \cdot \frac{G_1 + 1}{B_1 + 1} \right) + \qquad (6)$$
$$V_2 \sum_{S_{G2}} \left( \frac{S_2 + O_2}{2} \cdot \frac{G_2 + 1}{B_2 + 1} \right) + V_3 \sum_{S_{G3}} \left( \frac{S_3 + O_3}{2} \cdot \frac{G_3 + 1}{B_3 + 1} \right)$$

where $S_1$, $S_2$, and $S_3$, are respectively the single-, double- and triple-word term scores in the input local index (i.e. of the input text portion) which are averaged with the single-, double- and triple-word terms ($O_1$, $O_2$, and $O_3$ respectively) in the local index of each of the reference documents in the database and summed over all terms input local text terms $S_{G1}$, $S_{G2}$, and $S_{G3}$. Parameters $V_1$, $V_2$ and $V_3$, are respectively an arbitrary additional weighting applied to the sum of the respective single-, double-, and triple word sums to reflect the increased importance that text terms of increasing number of constituent elements (word) makes to the relevance of the document.

Additional terms $G_i$, and $B_i$ in Equation (6) are respectively parameters representative of the number of "good" i.e. ($G_i$)

and "bad" ($B_i$) matches (i.e. the number of reference documents for which positive and negative indications of relevance are received from the user input) which each respecting text term occurs in. The parameter $G_i$ is the number of documents that contain that term that were positively weighted and the parameter $B_i$ is the number of documents that contain that term that were negatively weighted. For example, if in the set of search results, 2 documents where positively weighted and 1 document was negatively weighted and all 3 of those documents contained the term "tiger", then a multiplier of (2+1)/(1+1)=3/2=1.5 would be applied to that term. Alternatively if in the same set, 1 document was positively weighted and 1 document was negatively weighted, and both documents contained the term "tiger", then a multiplier of (1+1)/(1+1)=2/2=1 would be applied to that term.

The refined match formula for determining reference documents of increased relevance of Equation (6) may be reduced to the following relationships:

$$S_x = f(L_x \cap G_x) \quad (7)$$

$$Q_x = V_x \sum_{i=1}^{M_x} S_{xi} \quad (8)$$

$$T_n = \sum_{i=1}^{N} Q_{xi} \quad (9)$$

where: $L_x$ is the set of terms of x length for the input text portion; $G_x$ is the set of terms of x length for the reference document; $f(L_x \cap G_x)$ is a function for conversion of a set of intersecting terms $L_x \cap G_x$ in the input text portion and a reference document to a set $S_x$ of the corresponding scores for those terms by adding together the local term index weights for the input text portion and the reference document for each term; $V_x$ is a scaling factor applied to terms of x length; $S_{xi}$ is the score of the $i^{th}$ term in the set of intersected terms of x length; $Q_x$ is the modified term score for each set of terms $S_x$; $M_x$ is the number of terms in the set $S_x$; N is the maximum word length of terms (i.e. 3 where text terms of up to triple-word lengths are used); and $T_n$ is the document score for the $n^{th}$ reference document G as a so measure of relevance to the input text portion L.

EXAMPLE 3

The matching method 200 described above is readily appreciated in the following example. Assuming the input text portion to which a user wishes to find similar/relevant reference documents is:

Input text portion: L="The quick brown fox jumped over the lazy dog"

The single-word ($L_1$), double-word ($L_2$), and triple-word ($L_3$) text terms of the input text portion determined by the paring procedure are the sets:
$L_1$={quick, brown, fox, jumped, over, lazy, dog}
$L_2$={quick brown, brown fox, fox jumped, jumped over, lazy dog}
$L_3$={quick brown fox, brown fox jumped, fox jumped over}

Next, assume the database (111) includes the reference document:

Reference document: G="The slow brown fox jumped over the lazy cat"

The single-word ($G_1$), double-word ($G_2$), and triple-word ($G_3$) text terms of reference document G determined by the parsing procedure are the sets:
$G_1$={slow, brown, fox, jumped, over, lazy, cat}
$G_2$={slow brown, brown fox, fox jumped, jumped over, lazy cat}
$G_3$={slow brown fox, brown fox jumped, fox jumped over}

For ease of the present example, it is assumed that all the text terms have a term weight in their relevant local term index of one (i.e. all terms are equally weighted). Further, it is assumed that the additional scaling factors $V_x$ the scaling factors for single, double, and triple-word terms are [$V_1$=1, $V_2$=2, $V_3$=4].

The intersection between the single-, double- and triple word terms in the input text portion L and the reference document G are respectively:
$L_1 \cap G_1$={brown; fox; jumped; over; lazy}
$L_2 \cap G_2$={brown fox; fox jumped; jumped over}
$L_3 \cap G_3$={brown fox jumped; fox jumped over}
and the respective scores for each term set (from Equation (7) are:
$S_1$={1+1; 1+1; 1+1; 1+1}={2; 2; 2; 2},
$S_2$={2, 2, 2}, $S_3$={2, 2}

Next, using Equation (8), the modified term scores for each set of single-, double- and triple word terms are:
$Q_1 = V_1 \times \Sigma S_1 = 1 \times 10 = 10$; $Q_2 = 2 \times 6 = 12$; $Q_3 = 4 \times 4 = 12$
and finally, using Equation (9), the document score T for reference document G which is a measure of the relevance of the reference document G to input text portion L, is given by $$T_G = 10 + 12 + 12 = 34$$

For comparison, consider the further reference document:
Reference Document H="The lazy brown fox sat on the mat".

The single-word ($H_1$), double-word ($H_2$), and triple-word ($H_3$) text terms of reference to document G determined by the parsing procedure are the sets:
$H_1$={lazy, brown, fox, sat, mat}
$H_2$={lazy brown, brown fox, fox sat}
$H_3$={lazy brown fox, brown fox sat}

Again, the intersection between the single-, double- and triple word terms in the input text portion L and the reference document Hare respectively:
$L_1 \cap H_1$={fox; brown}
$L_2 \cap H_2$={brown fox}
$L_3 \cap H_3$={NULL}
and the respective scores for each term set are:
$S_1$={2; 2}, $S_2$={2}, $S_3$ {0}

Next, the modified term scores for each set of single-, double- and triple word terms for reference document H are:
$Q_1 = 1 \times 4 = 4$; $Q_2 = 2 \times 2 = 4$; $Q_3 = 4 \times 0 = 0$
and the document score T for reference document H is:

$$T_H = 4 + 4 + 0 = 8.$$

Reference document G ($T_G$=34) is clearly of closer context and hence greater relevance to the input text portion L than reference document H ($T_H$=8), and this is clearly reflected in the reference scores, T.

Turning back to FIG. 4, the method 250 comprises the step of re-forming 255 the input local term index on the basis of the user input (and/or data obtained from additional/external information sources), and, on the basis of the re-formed input local term index, querying the database to identify one or more relevant reference documents of enhanced relevance to the input text portion 257. A representation of the further identified reference documents of enhanced relevance my then be output 259 to the user interface for further viewing and inspection by the user.

In an example arrangement, the re-forming of the input local term index in step 255 may comprise re-assigning the input local text term weights of the input text terms stored in the input local index. The terms for which the weights are re-assigned may be those which also appear in each of the reference documents for which user-determined input is received. In this arrangement, step 257 may comprise, on the basis of the re-assigned input local text term weights, querying the database to identify one or more relevant reference documents of enhanced relevance to the input text portion.

Optionally, method 250 may be repeated 252 by repeating steps 251-259, thereby identifying and outputting one or more relevant further documents of increased enhanced relevance in respect of the relevant text terms in the text portion with each iteration. The method may be repeated a plurality of times until the user is satisfied that the reference documents received as a result of the database search are sufficient for their current needs.

For each reference document for which a positive indication of relevance is received, the associated weighting of each of the input text terms in the input local index which also appear in the local text term index of the positively-identified reference document may be increased by a predetermined amount. The predetermined amount may be a multiplier applied to the index term weight. The multiplier may be a number greater than one. The multiplier may be a number between 1 and 10000 or more. The multiplier may be a number between 1 and 1,000, 1 and 500, 1 and 100, 1 and 50, 1 and 40, 1 and 30, 1 and 20, 1 and 10, 1 and 5 and may be, for example, 1, 1.5, 2, 2.5, 3, 3.5, 4, 4.5, 5, 6, 7, 8, 9, 10, 20, 30, 40, 50, 100, 200, 300, 400, 500, 1000, 2000, 3000, 4000, 5000, 6000, 7000, 8000, 9000 or 10000. Particular text terms may appear in a plurality of reference documents. The multiplier may depend on the number of reference documents which receive a positive indication and in which a particular text term appears. For instance, a particular text term appears in only one document which receives a positive indication, the multiplier applied to the text term may be a first multiplier. If the particular text term appears in two documents, the multiplier applied to the text term may be a second multiplier greater than the first multiplier. Similarly, if the particular text term appears in the documents, the multiplier applied to the text term may be a third multiplier greater than the second multiplier, and so on. As an example, the multiplier may be 2 for one document with positive indication, 4 for two documents, 8 for four documents, etc. Other multipliers may of course be used, and the particular multiplier values may be dynamic, for example taking into account factors such as user interaction, heuristic analysis, or other factors as would be appreciated by the skilled addressee.

For each reference document for which a negative indication of relevance is received, the associated weighting of each of the input text terms in the input local index which also appear in the local text term index of the negatively-identified reference document may be decreased by a predetermined amount. In particular arrangements, for each reference document for which a negative indication of relevance is received, the associated weighting of each of the input text terms in the input local index which also appear in the local text term index of the negatively-identified reference document may be decreased to a value of zero. The predetermined amount may be a multiplier applied to the index term weight. The multiplier may be zero such that a selected term has no relevance to subsequent interactions. In alternate arrangements, the multiplier may be a value between 0 and 1 such that the text term has a reduced weighting, which would act to give the text term a reduced influence on subsequent calculations and matching queries, but still retains some influence for subsequent queries of the database to identify the one or more relevant reference documents of enhanced relevance to the input text portion.

Where a selected text term appears in one or documents which receive a positive indication of relevance, and the selected text term also appears in one or documents which receive a negative indication of relevance, the associated weighting of the selected text term in the input local index may be updated based on a combination of the positive and negative indications. Where the selected text term appears in one or documents which receive a positive indication of relevance, and the selected text term also appears in an equal number of documents which receive a negative indication of relevance, the associated weighting of the selected text term in the input local index may be unchanged.

For example, where a positive indication of relevance of a particular reference document (positive relevance document) is received from the user, the local term weight of text terms in the input local index which also appear in the positive relevance document may be increased. Such terms with increased weight in the re-formed local term index will then have a greater influence on the relevance score assigned to each of the reference documents when a further query of the database is performed, and thus documents of greater or enhanced relevance will receive a higher score and be returned to the user in the search results as a document of enhanced relevance. Similarly, where a negative indication of relevance of a particular reference document (negative relevance document) is received from the user, the local term weight of text terms in the input local index which also appear in the positive relevance document may be decreased. Such terms with decreased weight therefore, will have a lesser influence on determining the document scores for reference documents in the database in subsequent searches, and therefore reference documents which contain such negatively weighted terms will receive a lower score and be presented to the user as being less relevant than other reference documents. Of course, text terms in the input local index may appear in reference documents which receive both positive and negative indications of relevance from the user input. In such cases the positive and negative increases/reductions in the term weight may balance (if an equal number of positive and negative documents containing the term are identified) and thus the local term weight in the input local index for that term will not change.

Alternatively, if a particular term appears in a plurality of reference documents which receive user input, and an uneven number of positive and negative indications of relevance of those documents is received, then the local weight for the text term will be a combination of the increasing/decreasing term weight adjustments. For example, if a particular term is given a local term weight of 50 (between 1 and 100, say) and the term appears in ten reference documents, six of which receive a positive indication of relevance from the user, and four of which receive a negative indication of relevance from the user. In this case, each positive indication may increase the term weight by 1 and each negative indication may decrease the term weight by 1. Therefore, in the re-formed local index, the there would be a multiplier of $(6+1)/(4+1)=7/5=1.4$ applied to the particular text term, therefore if the original term weight was 50, the resulting term score would be $50*1.4=70$, i.e. an overall increase in weight. Other interactions and weight re-assignment methods are of course envisaged such as a positive/negative multiplier as discussed below.

Such user interactions may be recorded and stored in the database 111 to be used in further analysis on the terms, for example using self-learning techniques, for the system to "learn" which text terms and phrases are significant in a particular environment or application. Such self-learning may be utilised to modify the global term weights, and may, for example, be implemented by an additional term in Equations (1) to (4) above.

In an example arrangement, the re-forming of the input local term index in step 255 may comprise forming an augmented input local term index on the basis of text terms in the local term index of reference documents receiving a positive indication of relevance. In this arrangement, step 257 may comprise, on the basis of the input local text term weights in the augmented input local text term index, querying the database to identify one or more relevant reference documents of enhanced relevance to the input text portion.

For each reference document for which a positive indication of relevance is received, terms in the positively identified reference document which do not appear in the input local term index may be added thereto to form the augmented local text term index together with associated local index text term weights determined.

Such data collected from each user's interactions stored in the database may be utilised in a number of ways to improve the overall performance of the system. For instance, as discussed above in relation to individual user accounts, the user's personal interactions are recorded against a personal user term index, which records text terms which have been up- or down-weighted as a result of the user's positive or negative interactions with reference documents in previous searches. Each term in the user term index may also be associated with a term weight modifier which is used to modify the local input index of an input text portion for which the user seek to find relevant reference documents in a search query. Such a user term index may be continually updated based on new searches and interactions, so that the more the user interacts with the system, the more improved their search results become, thus increasing the user experience as the system increasingly "learns" what is important to the particular user and provides relevant search query results.

The data collected from many user interactions, may also be used to improve the document matching capabilities globally so that all users benefit from the interactions of all other users. For example, the user interactions may be utilised to modify the global term index in a "self-learning" arrangement where many positive or negative indications are received for particular text terms or phrases, thus indicating that particular terms or phrases are more or less relevant than others, although it will be appreciated that such information may be context specific, for example to a specific type of document, industry or application. Such global term index modification based on user interactions has the significant advantage of improving the user experience for all users of the system by returning more relevant initial results to a search query than could be achieved without any such additional insight from the users of the system themselves.

As will be appreciated by the skilled addressee, the text portion may be any text string comprising a plurality of text words. For example, the text portion may be a text document, or may be selected from one or more of the group of: a text string comprising one or more words; a text document; a book; an article; a text record; a certificate; an agreement; a contract; a manuscript; a paper; a scientific paper; a patent specification; a resume; a curriculum vitae; a legal transcript; a legal document; or a news report, among many others as will be appreciated by the skilled addressee. Similarly, the reference documents may be text documents representative of a document selected from one or more of the group of: a book; an article; a text record; a certificate; an agreement; a contract; a manuscript; a paper; a scientific paper; a patent specification; an employment advertisement; a legal transcript; a legal document; or a news report, among many others as will be appreciated by the skilled addressee. Each of the reference documents may be assigned a document relevance score representative of the relevance to the input text portion.

In a further arrangement of the refinement method 250 of FIG. 4, the input text portion may comprise one or more search terms and there is provided a method for refining the results of a search on the search terms where the search results comprise a representation of a selected plurality of reference documents. Again, the reference documents displayed being of relevance to the search terms, the selected plurality of reference documents comprising a subset of a plurality of documents in a database. In this example arrangement, the method comprises the steps of forming a local term index from the search terms (similarly to step 208 of FIG. 3), the local term index comprising one or more text terms, each local text term associated with a local text term weight. As per FIG. 4, the search results are received and displayed 216 (of FIG. 4) on a user interface, the user interface comprising input means for receiving user input 251 with respect to each one or more of the plurality of the displayed reference documents. The user interface may be provided on a client device as disclosed above. User input is accepted 253 on one or more of the displayed reference documents, and the input local term index re-formed 255 on the basis of the user input. Next, on the basis of the re-formed input local term index, the database 111 is queried 257 to identify one or more documents of enhanced relevance to the one or more search terms; and a representation of the further identified reference documents of enhanced relevance outputted 259 to the user interface.

In the methods disclosed herein, a user interacts with the systems to conduct searches for documents of relevance to an input text portion, notionally a document comprising a significant portion of text. The interactions between the user and the systems is schematically depicted in FIG. 5 and FIG. 6.

Figure 5:
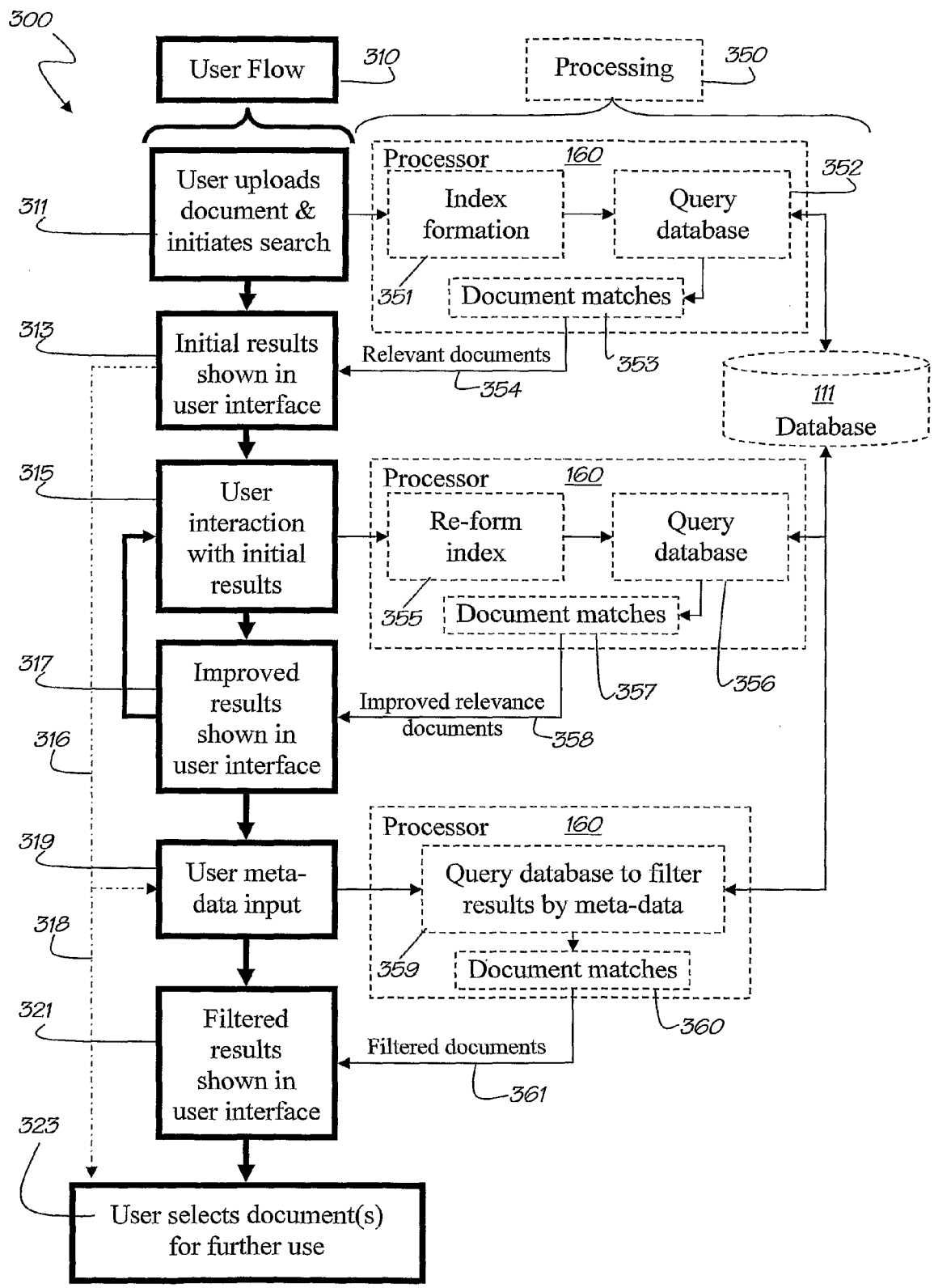
FIGS. 5 and 6 are schematic representations of user interactions with the system to conduct searches for documents of relevance to an input text portion in accordance with arrangements of the methods disclosed herein.
Figure 6:
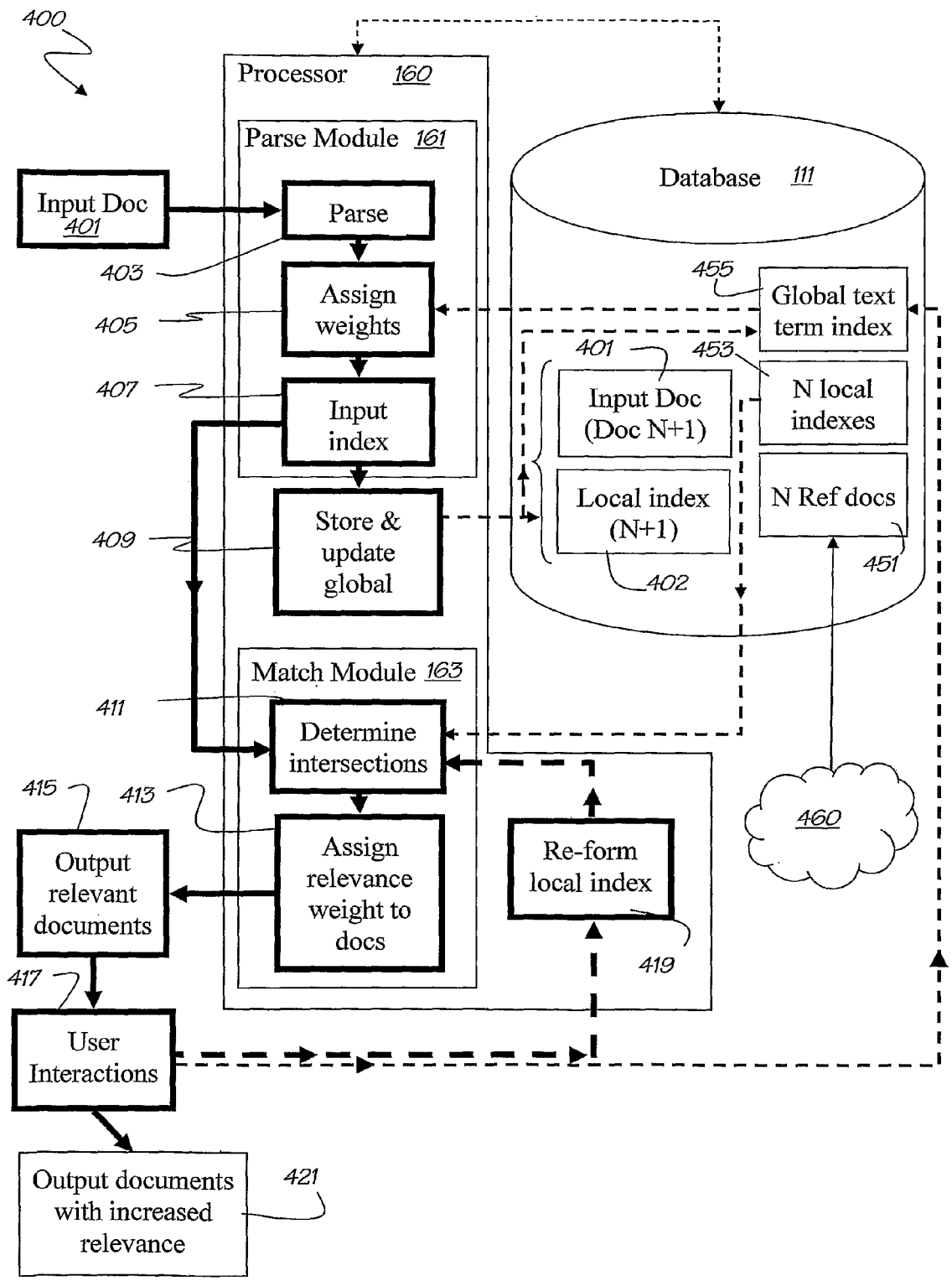

Referring initially to schematic 300 of FIG. 5, the user workflow 310, which the user sees during interactions with the system via a user interface (not shown) provided on a client device, is depicted in bold solid lines, whereas the system processing operations 350 are depicted in dashed lines.

Initially (not shown), the user accesses the systems, for example via a user interface e.g. a portal site (not shown) which may be a client device or computer terminal with access (e.g. via a network) to the processing systems. The user interface may be any suitable user interface adapted to receive information from a user, including being adapted to upload the text portion for analysis and initiate analysis on the text portion for the purpose of finding documents relevant to the text portion. The user interface is adapted to display information to the user as a result of the analysis i.e. a representation of documents which are deemed by the analysis to be of relevance to the text portion. The user interface may further be adapted to receive additional information from the user in relation to the relevance of the documents deemed by the analysis to be relevant to the text portion and to initiate a further analysis based on the additional user information. The user interface may for example be provided as a portal site, which may be accessible over a network such as a LAN or WAN such as for example the internet. The portal site may, for example, be an internet portal site and the user may access the portal site via a suitable internet protocol as would be appreciated by the skilled addressee. Once connected to the processing system, the user uploads 311 a document comprising the text portion for which the user desires to find documents relevant to that text portion. The processor 160 receives the text portion (see step 202 of FIG. 3) of the uploaded document and forms an input text index portion 351 as discussed above (steps 204, 206 & 208 of FIG. 3). The processor parses the input text portion and assigns weights to text terms found in the text portion as described herein. The processor 161 next queries 352 the database 111 (of FIG. 2A) for document matches 535 which the processes deems to be relevant to the input text portion as discussed above. The relevant documents are output 354 from the processor 161 and are, displayed 313 on the user interface for the user to view. As discussed above, the user interface is adapted to facilitate interaction 315 by the user with the results and to receive additional information from the user regarding the relevance of the documents output from the processor in the initial query 352. If the user inputs additional relevance information regarding one or more of the documents, this additional information is sent to the processor 161 and, on the basis of the additional information, the processor 161 reforms 355 the index and performs a further query 356 of the database 111 to determine further document matches 357 of enhanced relevance to the text portion and the user's specific intention (i.e. of greater contextual relevance to the users specific requirements) and the documents of improved relevance are output 358 to the user interface for further review by the user. The user interface again may be adapted to allow further interaction 315 by the user with the improved relevance documents and to conduct further queries 356 to further improve the relevance of the documents output to the user interface. This interaction loop (315→356→317) may be performed by the user as many times as the user deems to be required to achieve a set of results displayed on the user interface with sufficiently match the users requirements, i.e. are of sufficient contextual relevance to the users need in relation to finding documents relevant to the input document. Such interaction may be terminated at any time by the user when they believe that documents of sufficient relevance have been obtained.

Alternatively, the user interaction 315 with the results may be optional—that is, the user will typically have a choice to either interact with the results to achieve a further set of results with improved relevance to the input text portion, or if the user believes the documents received after the initial query 352 are sufficient, may skip 316 the interaction 317 and further search query(ies) 356 and progress to the next step (e.g. input of user specific data or meta-data for specific refinement of the results) in the user flow 310.

In any case, once the user is satisfied of the relevance of the document received by the query/interaction procedure, the user progresses in the user flow and may be prompted to input additional user specific information via the user interface, e.g. meta-data input 319. Such meta-data may, for example in the case of searching employment advertisements, include information on the user's current location, desired job location, desired salary etc. The inputted user-specific meta data may then be received by processor 161 and a further query 359 of the database 111 may be conducted to filter the earlier query results on the basis of the meta-data to determine a further refinement 360 of the document matches and the meta-data filtered documents output 361 to the user interface.

The user interface is then adapted for the users to select 323 one or more of the documents retrieved by the above process for further use. Alternatively, the input of additional meta-data may alternatively be optional, and the user may decide to skip 318 such meta-data input and proceed directly to selection 323 of one or more of the documents retrieved by the process for further use.

Referring now to FIG. 5 there is depicted a further example schematic of a system 400 adapted to carry out the methods disclosed herein. Database 111 (as above) is used to store a plurality (N) of reference documents 451, each reference document having an associated local index 453. Global term index 455, as above, is used to store all the text terms across all the plurality of reference documents stored in database 111 along with an associated global term weight. In particular arrangements, the database 111 may be realised as a file-based implementation comprising one or a plurality of files. An input document 401, for example an input text portion or one or more search terms, is uploaded via a suitable connection (not shown, for example local area network, wide area network, or internet connection) to parse module 161 of processor 160. Parse module 161 parses 403 the input document 401 to determine one or more text terms of the input document and, with reference to global text term index 451, assigns 405 weights to the input text terms and forms 407 an input text term index comprising the text terms of the input document and the assigned term weights. Parse module 161 may parse the input document 401 using an identification means (not shown), which may comprise an algorithm for identification of text terms in the input document 401 as disclosed herein. Assignment 405 of weights by parse module 161 may be realised by an assignment means within the parse module 161, which may comprise an algorithm as disclosed herein for assignment of such weights. Finally, formation of the input text term index may be realised by an indexing means (not shown) within parse module 161, which may comprise an algorithm as disclosed herein for forming of such an index. In the arrangement where database 111 is realised in a file-based architecture, each of the text terms may be represented by a unique logical file, i.e. a computer readable file within an appropriate logical directory structure. The processor 160 then outputs 409 the input document 401 and the new associated local index 402 to the database 111 where, in particular arrangement, the input document 401 is stored therein and, depending on the context of the document or other factors, it may be added to the collection of reference documents 451. The processor may also update the global term index 455 based on the terms and term weights in the new input local index 402.

The newly formed input local index 402 is received by match module 163 of the processor 160 which queries the database 111 to determine 411 intersections with the plurality of local indexes 453 of reference documents 451, and assigns 413 a weighting to each of the reference documents based on the relevance of each reference document to the input document 401. This initial search ao query result is then output 415 from the processor 160 and displayed to the user on a suitable user interface (not shown). The user then interacts 417 with the results to provide positive and/or negative indications of the relevance of the initial search result based on their current requirements, and these interactions are transmitted to processor 160 which re-forms 419 the input local index 402 based on the user interactions. The re-formed local index 402 is then transmitted to the snatch module 163 where a further query of database 111 is conducted to determine new relevance weights of the reference documents 451, and the refined search results are output 413 for inspection by the user. The process of receiving user interaction, re-forming the input local index, and re-querying the database 111 may be repeated by the user as many times as necessary in order to retrieve search query results which the user deems to be sufficiently relevant to their current search requirements to receive one or more documents of increased relevance 421.

The reference documents 451 may be retrieved and stored in the database 111 from any suitable source 460. Such a source 460 may comprise a database, which may be accessible via a suitable network (e.g. LAN, WAN, internet) connection, for example comprising job advertisements, advertisements for items for sale (e.g. goods, services, properties (e.g. residential/commercial property etc)), news sources, or patent databases, web pages accessible via the internet, among many, many others as would be appreciated by the skilled addressee. The system 400 may periodically query such document source(s) 460 for new documents and when new documents are found, the processor may input such documents to parse module 401 to parse the new document for text terms and assign 405 weights to the text terms to form a local index for the new document, and store the document and associated local index in database 111 as an additional reference document.

Figure 7:
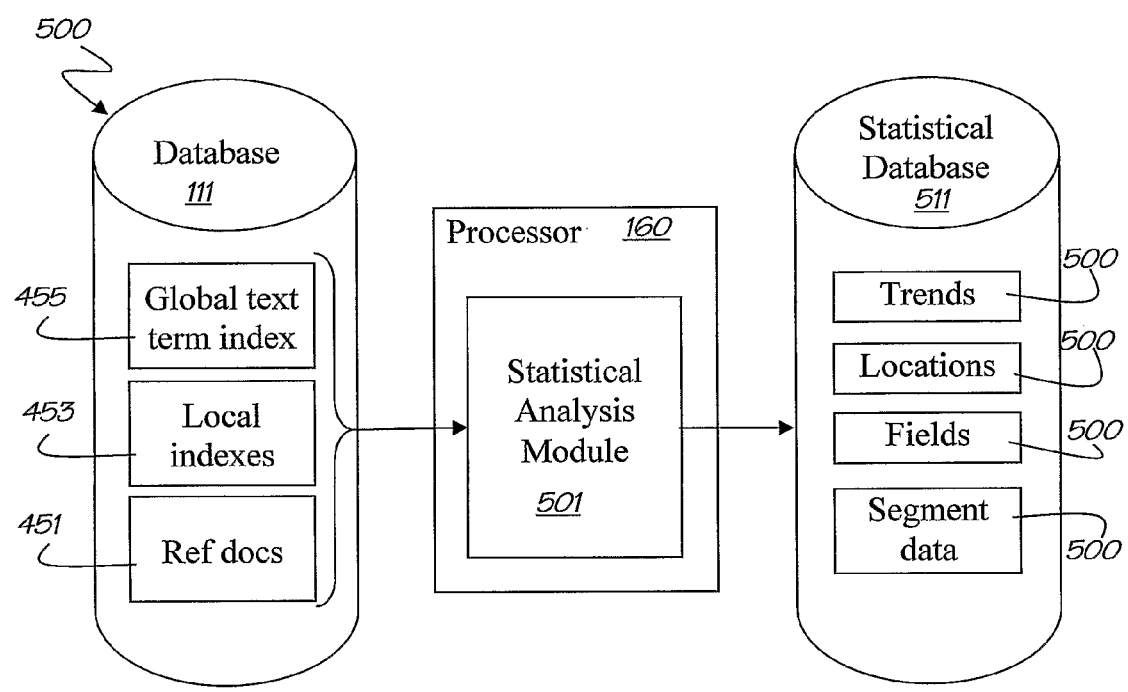
FIG. 7 is a schematic representation of a further arrangement of the system of FIGS. 2A and 2B.

In further arrangements, the system may also comprise analysis capabilities such as schematically depicted in system 500 of FIG. 7 where the processor 160 further comprises an analysis module 501 which analyses the information stored in database 111 from the reference documents 451, local reference document term indexes 453 and global term index 455 for trends and other, statistically available information as would be appreciated by the skilled addressee. For example, in the application of employment advertising, where the reference documents 451 comprise information/advertisements about available jobs and/or resume information of potential candidates, the analysis module may be adapted to analyse the information stored in the database 111. Such analysis may be adapted to determine such information as the location(s) of specific types of jobs e.g. which locations have a higher demand for construction workers, or be used to determine specific industries within selected geographical regions experiencing growth or decline over a certain time period. Such analysis may also be used as an input to search queries for job seekers, for example, the analysis of the information in the database may determine a growing overlap between two or more related, or previously unrelated industries, and whereas job seekers may typically be focused on searching for employment in one industry, the system may present the user with such related jobs in other industries where the user may not otherwise have searched.

Continuing the example of employment advertising, as a particular example of a use for the present system, the reference documents stored in the database may relate to employment (job) advertisements. In this example, the user may be a job-seeker and may input (i.e. upload to the database) a resume, with the aim to seek job ads which are related to the user's experience, characteristics or may otherwise be of interest to the user.

In this case, particular meta-data may also be used to filter the user's search results, for example a user specified or automatically generated location or desired job location (or both), can be used to geo-code the user and their preference/ job location. Such information may be stored in the user database discussed above for user-specific meta-data which can be used to increase the relevance of search results for individual users. For example, the geo-code may be used to up or down weight jobs based on their location (this essentially provides the ability to up-weight jobs which are located close to the user's home town, or desired work location(s). As the location of the job ads move further away from the user's preferred location, the geo-code may be used to progressively reduce the weighting, or even down-weight the document scores so that they appear less relevant in the search results. This can be linear, or non linear as opposed to binary step functions commonly used today (such as "inside 50 km radius"). The advantage of scaling the document matching scores based on user specific meta-data such as geo-location information is that highly relevant jobs beyond a user specified acceptable distance may still be included in the result set—which is not the case for standard step based algorithms—which exclude all results outside a set boundary. The disadvantage of this approach is that fewer documents are pruned from the potential result set, so the matching process is more load intensive. However, a hybrid of these two approaches can be used to limit some documents from the matching process and yet still analyse beyond a fixed boundary to ensure very relevant matches are not excluded.

Also, in the present employment advertising example, the user can submit an expected salary (user indicated) can be also be used to up- or down-weight the relevance of the reference documents (i.e. job ads) 451 in the database 111. For example, salary information in the reference documents 451 which are close to the user's desired salary may be up-weighted, while the weight will reduce, or even be negative as the salary departs from the desired. Again this variation in weighting can be linear or non linear. The above-mentioned advantages outlined for the variance of weighting based on geo-location are also relevant for salary-based weightings. Again hybrid models may be used to prune non-relevant reverence documents with completely unacceptable salaries, while still allowing searches to match documents outside of the user set acceptable range. Using this approach highly, relevant results with salaries outside of the search criteria may still appear in the result set.

The user's meta information (location, desired job locations, expected salary, job type, etc) can all be stored with the user account in a user database as discussed above. In specific examples, the system may be adapted to provide user specific alerts wherein the user enters contact information (for example an email address) and alerts may be set to match search score thresholds and the system may issue an alert as new matching documents arrive. This function would also be particularly useful for IP portfolio monitoring (for example for monitoring competitor portfolios) and, in the case of job searching, headhunting where the user may not actively be seeking a new job.

The user account may also be adapted to store information about the particular user's interactions with previous searches. This interaction information may then be incorporated into the matching process when the user conducts new searches so that user does not have to repeatedly select initial relevant documents when conducting similar searches, thus rapidly reducing the number of iterations the user would require to find highly relevant document matches.

It will, of course be appreciated by the skilled addressee that the above examples are presented for illustrative purposes only, and the system may be adapted for any type of industry or application where contextual information stored in documents as text is relevant. As will be appreciated, such a system has extremely wide-reaching capabilities and the present invention may be readily adapted to many such applications.

Therefore, it will be appreciated that the methods/apparatus/devices/systems described/illustrated above at least substantially provide schemes for information extraction from text strings and/or documents containing text portion(s) and in particular to methods and apparatus for analysing text portions of and/or documents and associating such documents with relevant information or documents from a database. The methods/apparatus/devices/systems described/illustrated above at least substantially further relate to identifying and retrieving documents related to specific text portions and specifically to identifying and retrieving text portions (or text fragments) of interest from a larger corpus of textual material by generating a list of relevant terms from the textual material and weighting such terms to be used to analyse a database of documents for information and/or documents related to the weighted terms The methods, apparatus and systems described herein, and/or shown in the drawings, are presented by way of example only and are not limiting as to the scope of the invention. Unless otherwise specifically stated, individual aspects and components of the methods, apparatus and systems may be modified, or may have been substituted therefore known equivalents, or as yet unknown substitutes such as may be developed in the future or such as may be found to be acceptable substitutes in the future. The methods, apparatus and systems may also be modified for a variety of applications while remaining within the scope and spirit of the claimed invention, since the range of potential applications is great, and since it is intended that the present methods, apparatus and systems be adaptable to many such variations.

The invention claimed is:

1. A method for analysing a text portion and retrieving documents relevant to the text portion, the method comprising:
   a) receiving an input comprising an input text portion;
   b) using a processor to identify at least one text term in the input text portion;
   c) using the processor, assigning at least one weight associated with the at least one text term;
   d) using the processor, to form an input local index of the at least one text term in the input text portion and at least one associated local term weight, wherein the at least one associated local term weight is determined with reference to a global term index stored in a database, the global term index comprising a plurality of global text terms and associated global text term weights, and being formed from a plurality of reference documents, wherein a representation of each of the reference documents is stored in the database;
   e) using the processor, querying the database to identify one or more of the reference documents of relevance with respect to the input text portion;
   f) outputting a representation of the identified relevant reference documents;
   g) displaying the relevant reference documents on a user interface, the user interface comprising input means for receiving user input with respect to each of the displayed reference documents;
   h) accepting user-input with respect to one or more of the displayed documents;
   i) using the processor, re-forming the input local term index on the basis of the user input;
   j) on the basis of the re-formed input local term index, using the processor to query the database to identify one or more relevant reference documents of enhanced relevance to the input text portion; and
   k) using the processor, outputting a representation of the further identified reference documents of enhanced relevance to the user interface for presentation to a user; wherein, the processor comprises a programmable data processing apparatus comprising instructions which execute via the processor to implement the steps (a) to (k).

2. The method as claimed in claim 1 wherein in step i) of claim 1, re-forming the input local term index comprises:
   i.1) re-assigning the input local text term weights of the input text terms which also appear in each of the reference documents for which user-determined input is received; and
   wherein step j) of claim 1 comprises:
   j.1) on the basis of the re-assigned input local text term weights, querying the database to identify one or more relevant reference documents of enhanced relevance to the input text portion.

3. The method as claimed in claim 1 further comprising repeating steps h) to k) of claim 1 thereby identifying and outputting one or more relevant further documents of increased enhanced relevance in respect of the relevant text terms in the text portion.

4. The method as claimed in claim 1 wherein the user input comprises additional relevance information comprising either a positive indication of relevance of a particular document or a negative indication of relevance of a particular document.

5. The method as claimed in claim 4 wherein for each reference document for which a positive indication of relevance is received, the associated weighting of each of the input text terms in the input local index which also appear in the local text term index of the positively-identified reference document is increased by a predetermined amount.

6. The method as claimed in claim 4 wherein for each reference document for which a negative indication of relevance is received, the associated weighting of each of the input text terms in the input local index which also appear in the local text term index of the negatively-identified reference document is decreased by a predetermined amount.

7. The method as claimed in claim 5 wherein the predetermined amount is a multiplier applied to the index term weight.

8. The method as claimed in claim 7 wherein the multiplier is zero such that a selected term has no relevance to subsequent interactions.

9. The method as claimed in claim 4 wherein where a selected text term appears in one or more documents which receive a positive indication of relevance, and the selected text term also appears in one or more documents which receive a negative indication of relevance, the associated weighting of the selected text term in the input local index is updated based on a combination of the positive and negative indications.

10. The method as claimed in claim 5 wherein in step step i) of claim 1, re-forming the input local term index comprises:
    i.2) forming an augmented input local term index on the basis of text terms in the local term index of documents receiving a positive indication of relevance; and
    wherein step j) of claim 1 comprises:
    j.2) on the basis of the input local text term weights in the augmented input local text term index, querying the database to identify one or more relevant reference documents of enhanced relevance to the input text portion.

11. The method as claimed in claim 10 wherein for each reference document for which a positive indication of relevance is received, terms in the positively identified reference document which do not appear in the input local term index are added thereto to form the augmented local text term index together with associated local index text term weights determined.

12. The method as claimed in claim 1 wherein the text portion is a text string comprising a plurality of text words or a text document.

13. The method as claimed in claim 1 wherein each of the reference documents is assigned a document relevance score representative of the relevance to the input text portion.

14. The method as claimed in claim 1 wherein the reference documents are text documents representative of a document selected from one or more of the group of: a book; an article; a text record; a certificate; an agreement; a contract; a manuscript; a paper; a scientific paper; a resume; a patent specification; an employment advertisement; a legal transcript; a legal document; an advertisement; or a news report.

15. The method for refining the results of a search, the search results comprising a representation of a selected plurality of reference documents, such reference documents displayed being of relevance to an input text portion comprising one or more search terms, the selected plurality of reference documents comprising a subset of a plurality of documents in a database, the method comprising the steps of:
    a) using a processor to form a local term index from the search terms in the input text portion, the local term index comprising one or more text terms, each local text term associated with a local text term weight;
    b) using the processor, receiving and displaying the search results on a user interface, the user interface comprising input means for receiving user input with respect to one or more of the plurality of the displayed reference documents;
    c) accepting user input on one or more of the displayed reference documents;
    d) using the processor, re-forming the local term index on the basis of the user input;
    e) on the basis of the re-formed input local term index, using the processor to query the database to identify one or more documents of enhanced relevance to the input text portion; and
    f) outputting a representation of the further identified reference documents of enhanced relevance to the user interface for presentation to a user;
        wherein, the processor comprises a programmable data processing apparatus comprising instructions which execute via the processor to implement the steps (a) to (f);
        wherein in step a) the local text term weights for each of the local text terms are derived from a global text term index, the global text term index comprising a plurality of text terms associated with global text term weights, wherein the global text term weights are derived from text term analysis of a plurality of documents.

16. A method as claimed in claim 15 wherein in step d), re-forming the input local term index comprises:
    d.1) re-assigning the input local text term weights of the input text terms which also appear in each of the reference documents for which user-determined input is received; and
    wherein step e) of claim 15 comprises:
    e.1) on the basis of the re-assigned input local text term weights, querying the database to identify one or more relevant reference documents of enhanced relevance to the input text portion.

17. The method as claimed in claim 15 wherein in step a) the local text term weights for each of the local text terms are equal.

18. The method as claimed in claim 15 wherein in step d), re-forming the input local term index comprises:
    d.2) forming an augmented input local term index on the basis of text terms in the local term index of documents receiving a positive indication of relevance; and
    wherein step e) comprises:
    e.2) on the basis of the input local text term weights in the augmented input local text term index, querying the database to identify one or more relevant reference documents of enhanced relevance to the input text portion.

19. The method as claimed in claim 18 wherein for each reference document for which a positive indication of relevance is received, new terms in the positively identified reference document which do not appear in the local term index are added thereto to form the augmented local text term index and associated local index text term weights for the new terms are determined.

20. The system for refining the results of a search, the search results comprising a representation of a selected plurality of documents of relevance to one or more search terms, the selected plurality of documents comprising a subset of a plurality of documents in a database, the system comprising:
    processing means for forming a local term index from the search terms, the local term index comprising one or more text terms, each local text term associated with a local text term weight;
    processing means for receiving and displaying the search results on a user interface, the user interface comprising input means for receiving user input with respect to each of the displayed reference documents, weights for each of the local text terms are derived from a global text term index, the global text term index comprising a plurality of text terms associated with global text term weights, wherein the global text term weights are derived from text term analysis of a plurality of documents;
    user input means for accepting user input on one or more of the displayed documents;
    processing means for analysing the user input and re-forming the input local term index on the basis of the user input;
    query means for querying the database on the basis of the re-formed input local term index to identify one or more documents of enhanced relevance to the input text portion; and
    output means for outputting a representation of the further identified reference documents of enhanced relevance.

21. A system for analysing an input text portion and retrieving documents relevant to the text portion, the system comprising:
    input means for receiving an input comprising an input text portion;
    identification means to identify at least one text term in the text portion;
    assignment means for assigning at least one weight associated with the at least one text term;
    indexing means for forming an input local term index of the at least one text term in the input text portion and at least one associated local term weight, wherein the at least one associated local text term weights is determined with reference to a global term index stored in a database, the global term index comprising a plurality of global text terms and associated global text term weights, and being formed from a plurality of reference documents, wherein a representation of each of the reference documents is stored in the database;
    query means for querying the database to identify one or more relevant reference documents with respect to the input text portion;

output means for outputting a representation of the identified relevant reference documents;
display means for displaying the relevant reference documents on a user interface, the user interface comprising input means for receiving user input with respect to each of the displayed reference documents;
user input means accepting user-input on one or more of the displayed documents;
processing means for analysing the user input and re-forming the input local text term index;
query means for querying the database on the basis of the re-formed input local text term index to identify one or more relevant reference documents of enhanced relevance to the input text portion; and
output means for outputting a representation of the further identified reference documents of enhanced relevance.

22. The system as claimed in claim 21 wherein the re-forming of the input local term index comprises: with the processing means, re-assigning the input local text term weights of the input text terms which also appear in each of the reference documents for which user-determined input is received; and
the querying of the database on the basis of the re-formed input local text term index comprises: with the query means, querying the database on the basis of the re-assigned input local text term weights to identify one or more relevant reference documents of enhanced relevance to the input text portion.

23. The system as claimed in claim 21 wherein the re-forming of the input local term index comprises: with the processing means, forming an augmented input local term index on the basis of text terms in the local term indexes of documents receiving a positive indication of relevance; and
the querying of the database on the basis of the re-formed input local text term index comprises: with the query means, querying the database on the basis of the input local text term weights in the augmented input local text term index to identify one or more relevant reference documents of enhanced relevance to the input text portion.

24. A non-transitory computer readable medium comprising a program for analysing a text portion and retrieving documents relevant to the text portion, said program controlling the operation of a data processing apparatus on which the program executes on a processor to perform the steps of:
a) receiving an input comprising an input text portion;
b) identify at least one text term in the text portion;
c) assigning at least one weight associated with the at least one text term;
d) forming an input local index of the at least one text term and at least one associated local term weight, wherein the at least one associated local term weight is determined with reference to a global term index stored in a database, the global term index comprising a plurality of global text terms and associated global text term weights, and being formed from a plurality of reference documents, wherein a representation of each of the reference documents is stored in the database
e) querying the database to identify one or more of the reference documents of relevance with respect to the input text portion;
f) outputting a representation of the identified relevant reference documents;
g) displaying the relevant reference documents on a user interface, the user interface comprising input means for receiving user input with respect to each of the displayed reference documents;
h) accepting user-input with respect to one or more of the displayed documents;
i) re-forming the input local term index on the basis of the user input;
j) on the basis of the re-formed input local term index, querying the database to identify one or more relevant reference documents of enhanced relevance to the input text portion; and
k) outputting a representation of the further identified reference documents of enhanced relevance.

25. A non-transitory computer readable medium comprising a program for refining the results of a search, the search results comprising a representation of a selected plurality of reference documents, such reference documents displayed being of relevance to an input text portion comprising one or more search terms, the selected plurality of documents comprising a subset of a plurality of documents in a database, said program controlling the operation of a data processing apparatus on which the program executes on a processor to perform the steps of:
a) forming a local term index from the search terms, the local term index comprising one or more text terms, each local text term associated with a local text term weight, wherein the local text term weights for each of the local text terms are derived from a global text term index, the global text term index comprising a plurality of text terms associated with global text term weights, wherein the global text term weights are derived from text term analysis of a plurality of documents;
b) receiving and displaying the search results on a user interface, the user interface comprising input means for receiving user input with respect to one or more of the plurality of the displayed reference documents;
c) accepting user input on one or more of the displayed documents;
d) re-forming the input local term index on the basis of the user input;
e) on the basis of the re-formed input local term index, querying the database to identify one or more documents of enhanced relevance to the input text portion; and
f) outputting a representation of the further identified reference documents of enhanced relevance.

* * * * *

UNITED STATES PATENT AND TRADEMARK OFFICE
CERTIFICATE OF CORRECTION

| | | |
|---|---|---|
| PATENT NO. | : 8,666,994 B2 | Page 1 of 1 |
| APPLICATION NO. | : 13/498244 | |
| DATED | : March 4, 2014 | |
| INVENTOR(S) | : Ogilvy et al. | |

It is certified that error appears in the above-identified patent and that said Letters Patent is hereby corrected as shown below:

In the Claims

Column 52, Line 50, Claim 10:

After "claim 5 wherein in step"
Delete "step".

Signed and Sealed this
Third Day of June, 2014

Michelle K. Lee
*Deputy Director of the United States Patent and Trademark Office*